US009178658B2

(12) United States Patent
Lee et al.

(10) Patent No.: US 9,178,658 B2
(45) Date of Patent: Nov. 3, 2015

(54) SYSTEM AND METHOD FOR CHANNEL INTERLEAVER AND LAYER MAPPING IN A COMMUNICATIONS SYSTEM

(75) Inventors: Jung Woon Lee, Plano, TX (US); Yufei Blankenship, Kildeer, IL (US)

(73) Assignee: Futurewei Technologies, Inc., Plano, TX (US)

( * ) Notice: Subject to any disclaimer, the term of this patent is extended or adjusted under 35 U.S.C. 154(b) by 822 days.

(21) Appl. No.: 12/772,787

(22) Filed: May 3, 2010

(65) Prior Publication Data

US 2010/0296603 A1    Nov. 25, 2010

Related U.S. Application Data

(60) Provisional application No. 61/176,024, filed on May 6, 2009, provisional application No. 61/219,269, filed on Jun. 22, 2009.

(51) Int. Cl.
*H04L 27/00* (2006.01)
*H04L 1/00* (2006.01)

(52) U.S. Cl.
CPC .................. *H04L 1/0071* (2013.01)

(58) Field of Classification Search
None
See application file for complete search history.

(56) References Cited

U.S. PATENT DOCUMENTS

| 2002/0022468 | A1 | 2/2002 | Yoon et al. | |
| 2005/0251725 | A1* | 11/2005 | Huang et al. | 714/752 |
| 2007/0025463 | A1* | 2/2007 | Aldana | 375/267 |
| 2008/0013610 | A1* | 1/2008 | Varadarajan et al. | 375/221 |
| 2008/0192718 | A1 | 8/2008 | Jongren et al. | |
| 2008/0232489 | A1* | 9/2008 | Tsai et al. | 375/260 |
| 2009/0147865 | A1* | 6/2009 | Zhang et al. | 375/259 |
| 2009/0262856 | A1* | 10/2009 | Onggosanusi et al. | 375/267 |
| 2009/0304109 | A1* | 12/2009 | Kotecha | 375/299 |
| 2010/0002790 | A1* | 1/2010 | Onggosanusi et al. | 375/260 |
| 2010/0027697 | A1* | 2/2010 | Malladi et al. | 375/260 |
| 2010/0039928 | A1* | 2/2010 | Noh et al. | 370/210 |
| 2010/0054353 | A1 | 3/2010 | Roh et al. | |

(Continued)

FOREIGN PATENT DOCUMENTS

| CN | 101369865 A | 2/2009 |
| WO | WO 2008/082277 A2 | 7/2008 |
| WO | WO 2009/042290 A1 | 4/2009 |

OTHER PUBLICATIONS

"3$^{rd}$ Generation Partnership Project; Technical Specification Group Radio Access Network; Evolved Universal Terrestrial Radio Access (E-UTRA); Physical Channels and Modulation," 3GPP TS 36.211, V8.5.0, Release 8, Dec. 2008, 82 pages.

(Continued)

*Primary Examiner* — Shuwang Liu
*Assistant Examiner* — Gina McKie
(74) *Attorney, Agent, or Firm* — Slater & Matsil, LLP

(57) ABSTRACT

A system and method for channel interleaver and layer mapping in a communications system with spatial multiplexing are provided. A method for transmitting information over M layers, where M is a positive integer value representing a number of spatial layers, and M≥2, includes receiving at least one codeword to transmit, grouping a plurality of symbols in the at least one codeword into M groups, mapping the M groups to the M layers, and transmitting the M layers. The at least one codeword includes the plurality of symbols, and each symbol includes two or more code bits.

27 Claims, 19 Drawing Sheets

(56) References Cited

U.S. PATENT DOCUMENTS

2011/0268093 A1* 11/2011 Dai et al. ..................... 370/335
2012/0275532 A1* 11/2012 Wang et al. .................. 375/267

OTHER PUBLICATIONS

"International Search Report and Written Opinion," Application No. PCT/CN2010/072467, Applicant: Huawei Technologies Co., Ltd. et al., mailing date: Aug. 5, 2010, 11 pages.

* cited by examiner

SYSTEM AND METHOD FOR CHANNEL INTERLEAVER AND LAYER MAPPING IN A COMMUNICATIONS SYSTEM

This application claims the benefit of U.S. Provisional Application No. 61/176,024, filed on May 6, 2009, entitled "System and Method for Channel Interleaver and Layer Mapping in a Wireless Communications System," and U.S. Provisional Application No. 61/219,269, filed on Jun. 22, 2009, entitled "System and Method for Channel Interleaver and Layer Mapping in a Wireless Communications System," which applications are hereby incorporated herein by reference.

TECHNICAL FIELD

The present invention relates generally to wireless communications, and more particularly to a system and method for channel interleaver and layer mapping in a communications system with spatial multiplexing.

BACKGROUND

The increasing demand of wireless high data service has motivated various standards bodies such as the Third Generation Partnership Project 2 (3GPP2), the Third Generation Partnership Project (3GPP) and IEEE-802.16 to develop various wireless systems supporting faster data rate, higher spectral efficiency and more reliable communication such as Ultra Mobile Broadband (UMB), Long Term Evolution (LTE), and wireless Metropolitan Area Networks (MAN), respectively. Additionally, since multiple input, multiple output (MIMO) operation offers significant increases in data throughput and higher spectral efficiency without additional bandwidth or transmit power, MIMO is considered as an essential technology in providing the high data rate and increased system throughput in the various standard bodies.

Currently, LTE offers only MIMO in a downlink (DL) portion of a communications system, with support for up to two (2) codewords and four (4) transmit antennas, wherein DL refers to the transmission from the base station to a user equipment (UE). As used herein, a codeword refers to an encoded and modulated symbol sequence corresponding to an information block, such as the transport block defined in 3GPP specifications. No symbol-level channel interleaver was defined for LTE downlink because the time-frequency diversity due to the turbo internal interleaver and the rate matcher was found to be sufficient. Additionally, codeword to layer mapping was defined for LTE downlink without special consideration of successive interference cancellation (SIC) receiver.

In contrast to DL, only single antenna transmission is supported in LTE uplink (UL), i.e., transmission from the UE to the base station. Since single antenna transmission means that there is only one layer, LTE does not consider the transport block-to-layer mapping for UL. Due to the limited frequency diversity associated with single carrier frequency division multiple access (SC-FDMA), a symbol-level channel interleaver was defined for LTE UL. Without causing confusion, the symbol-level channel interleaver will be simply referred to as channel interleaver in the following. When upgrading LTE to LTE-Advanced, multiple-layer MIMO will be defined in order to reach the high throughput target. The processing defined for DL cannot be directly transferred to UL due to the different transmission scheme, orthogonal frequency division multiplexing (OFDM) for DL vs. SC-FDMA for UL. Thus there is a need to define channel interleaver and codeword-to-layer mapping that maximizes the throughput for the LTE-Advanced MIMO UL. In particular, the design needs to consider the usage of a SIC receiver in the base station, since the base station is able to handle more complexity than the UE.

SUMMARY

These technical advantages are generally achieved, by embodiments of a system and method for channel interleaver and layer mapping in a communications system with spatial multiplexing.

In accordance with an embodiment, a method for transmitting information over M layers, where M is a positive integer value representing a number of spatial layers, and M≥2 is provided. The method includes receiving at least one codeword to transmit, grouping a plurality of symbols in the at least one codeword into M groups, mapping the M groups to the M layers, and transmitting the M layers. The at least one codeword includes the plurality of symbols, each symbol composed of two or more code bits.

In accordance with another embodiment, a method for transmitting information is provided. The method includes processing a transport channel to generate a plurality of codewords, separately interleaving the plurality of codewords, mapping the interleaved codewords to multiple spatial layers, and transmitting the multiple spatial layers. Each codeword includes a sequence of modulation symbols, and the interleaving is performed over the modulation symbols, thereby producing interleaved codewords.

In accordance with another embodiment, a communications device is provided. The communications device includes a transmitter coupled to at least one antenna, a transport channel processing unit coupled to a processor, a channel interleaver coupled to the transport channel processing unit, and a physical channel processing unit coupled to the channel interleaver and to the transmitter. The transmitter transmits signals with the at least one transmit antenna, the transport channel processing unit provides transport channel processing to a transport block provided by the processor, the channel interleaver interleaves modulation symbols of a plurality of transport blocks, and the physical channel processing unit provides physical channel processing to the interleaved modulation symbols provided by the channel interleaver.

An advantage of an embodiment is that layer mapping in the presence of a channel interleaver is provided. The layer mapping enables the use of a SIC receiver.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a communications systems adherent to 3GPP LTE and LTE-Advanced technical standards. However, the embodiments may be applicable to other wireless communications systems, such as those that conform to UMB, WiMAX, and so forth, technical standards. Therefore, the discussion of LTE and LTE-Advanced wireless communications systems should not be construed as being limiting to either the scope or the spirit of the embodiments.

Figure 1:
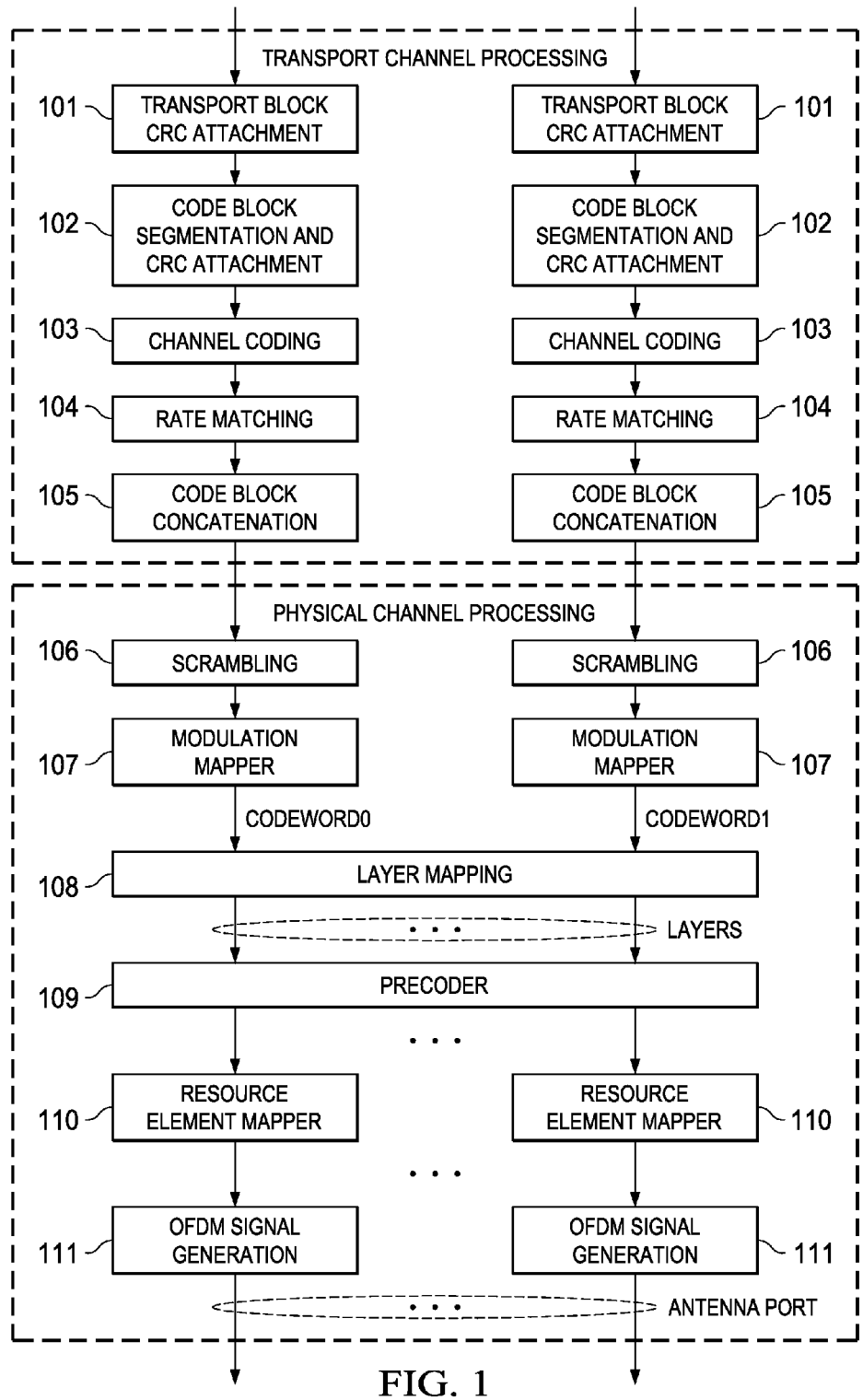
FIG. 1 is a flow diagram of LTE downlink physical layer processing.

FIG. 1 illustrates a flowchart of DL physical layer processing. First, up to two transport blocks (TB) are input and for each TB, a cyclic redundancy check (CRC) is attached to the TB at Transport block CRC attachment unit 101. If the size of the TB is larger than a preset threshold, Code block segmentation and Code block CRC attachment unit 102 is used to split the TB into multiple code blocks (CB) and a CRC is attached to each CB. This may be performed to reduce the complexity of turbo encoder and decoder. If the TB is not larger than the preset threshold, then the TB may not be split into multiple CBs.

Then, each CB (or TB if the TB is not split) may be turbo-encoded in Channel Coding unit 103 to provide for error correction at a receiver. In Rate matching unit 104, the coded bits of each CB is interleaved and the redundancy version (RV) for hybrid automatic repeat request (HARD) is generated. If there are multiple CBs in one TB, they may be concatenated in a Code block concatenation unit 105 and the coded symbols to be transmitted is scrambled in a Scrambling unit 106 to randomize the transmission bits.

Before mapping codewords to layers, the scrambled bits may be modulated into complex-valued symbols using Quadrature Phase Shift Keying (QPSK), 16 Quadrature Amplitude Modulation (QAM) or 64QAM in a Modulation Mapper unit 107. The complex-valued modulation symbols for each codeword to be transmitted are mapped onto one or several layers in a Layer Mapping unit 108. While, a Precoder unit 109 takes as input the vector comprising one symbol from each layer and generates a block of vector to be mapped onto resources on each of the antenna ports.

In a Resource Element Mapper unit 110, the precoded symbols are mapped into time-frequency domain resource element of each antenna port and then converted to orthogonal frequency division multiplexing (OFDM) baseband signal in an OFDM signal generation unit 111. The baseband signal is then upconverted to a carrier frequency for each antenna port.

FIGS. 2a through 2e illustrate details of layer mapping employed in DL MIMO in a LTE communications system.

Table 1 shows codeword-to-layer mapping for a number of different codeword and layer combinations.

TABLE 1

| | | | Codeword-to-layer mapping. | |
|---|---|---|---|---|
| Case | Number of layers | Number of code words | Codeword-to-layer mapping $i = 0, 1, \ldots, M_{symb}^{layer} - 1$ | |
| A | 1 | 1 | $x^{(0)}(i) = d^{(0)}(i)$ | $M_{symb}^{layer} = M_{symb}^{(0)}$ |
| B | 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| C | 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |

TABLE 1-continued

Codeword-to-layer mapping.

| Case | Number of layers | Number of code words | Codeword-to-layer mapping $i = 0, 1, \ldots, M_{symb}^{layer} - 1$ | |
|---|---|---|---|---|
| D | 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| E | 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |

Figure 2A:
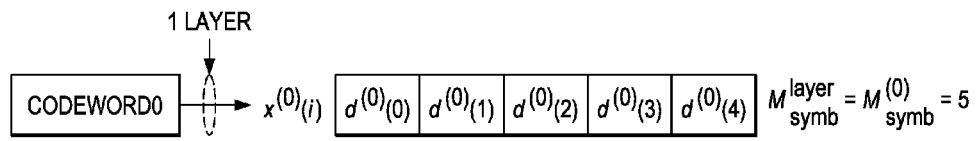
FIG. 2a is a diagram of codeword-to-layer mapping of one codeword to one layer.
Figure 2B:
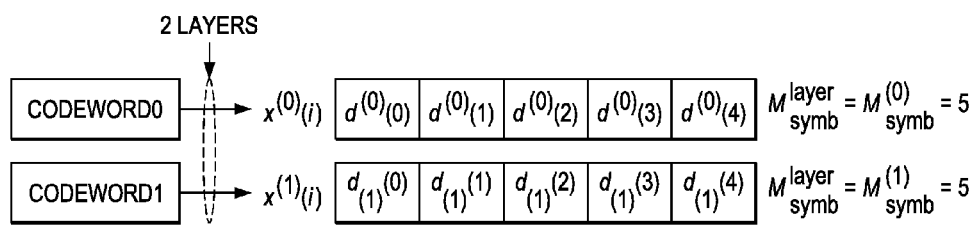
FIG. 2b is a diagram of codeword-to-layer mapping of two codewords to two layers.
Figure 2C:
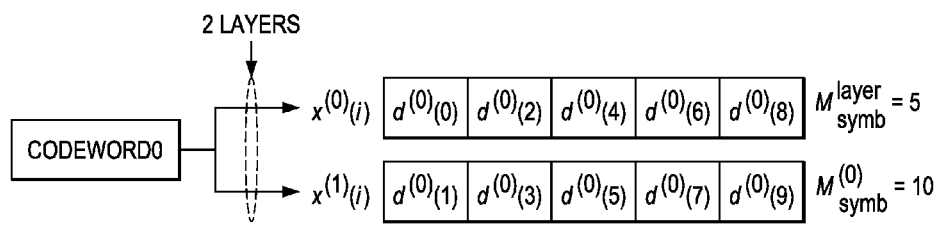
FIG. 2c is a diagram of codeword-to-layer mapping of one codeword to two layers.
Figure 2D:
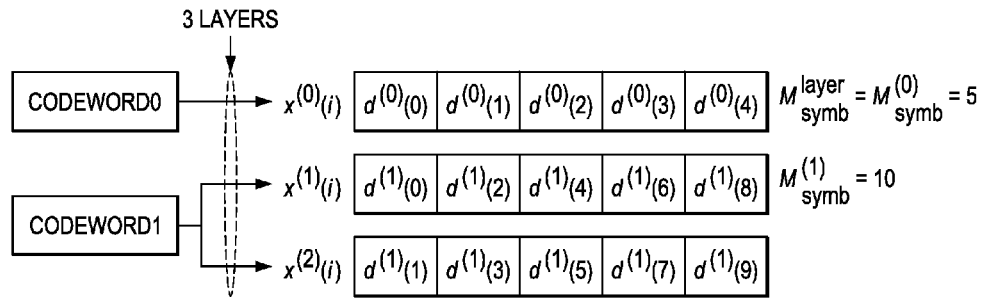
FIG. 2d is a diagram of codeword-to-layer mapping of two codewords to three layers.
Figure 2E:
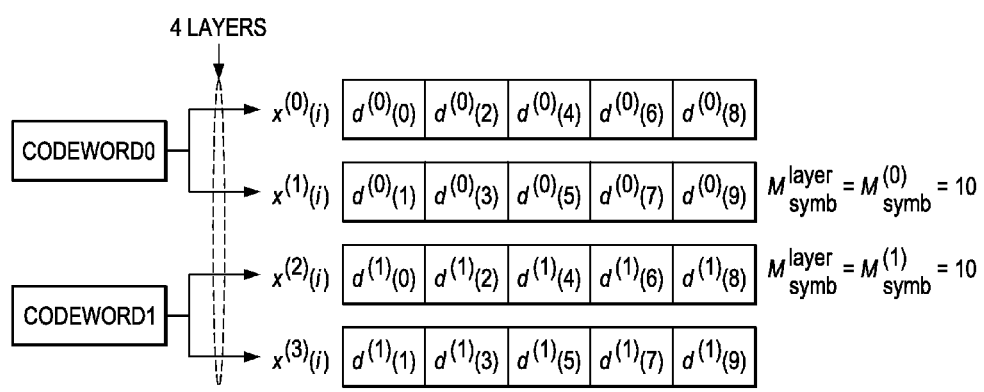
FIG. 2e is a diagram of codeword-to-layer mapping of two codewords to four layers.

As an example, FIG. 2d graphically represents case D shown in Table 1. In FIG. 2d, the complex-valued modulation symbols, $d^{(c)}(0), \ldots, d^{(c)}(M_{symb}^{(c)}-1)$, for codeword c shall be mapped onto the layers $x(i)=[x^{(0)}(i) \ldots x^{(v-1)}(i)]^T$, $i=0,1, \ldots, M_{symb}^{layer}-1$, where v is the number of layers, $M_{symb}^{layer}$ and $M_{symb}^{(c)}$ are the number of modulation symbol per layer and the number of modulation symbol to be transmitted in codeword c. FIG. 2d illustrates a case wherein two codewords are mapped onto three layers.

When multiple codeword (MCW) is employed with MIMO, a successive interference cancellation (SIC) receiver is preferred over a Minimum-mean-square-error (MMSE) receiver since SIC receiver may be able to outperform the MMSE receiver. The SIC receiver has the potential to cancel inter-stream crosstalk thus improving the link quality. Furthermore, it is well known that a MIMO communications system with MCW (MCW-MIMO) outperforms a MIMO communications system using single codeword (SCW) if a SIC receiver is used.

For discussion purposes, assume a SIC receiver is used for MCW-MIMO with two codewords. MMSE is first performed and the receiver tries to decode both codewords. If both codewords pass CRC, they are declared to be error-free and if both fail in the CRC check, they are declared to be in error. If one of codewords passes CRC check, the baseband signal corresponding to the successfully decoded codeword can be reconstructed. Since the reconstructed signal is interference to the failed codeword (the codeword that was not successfully decoded), it is subtracted from the received signal of the failed codeword in signal buffer of the SIC receiver. Then MMSE or maximum ratio combining (MRC) processing is performed and the failed codeword is decoded.

To facilitate a SIC receiver, at least two codewords or code blocks (CBs) are needed. To maximize the performance, the modulation symbols for one codeword or CB should be placed as much as possible within a single layer. In other words, the modulation symbols of one codeword or CB should not occupy the same time-frequency resource element on different layers if possible.

Figure 3:
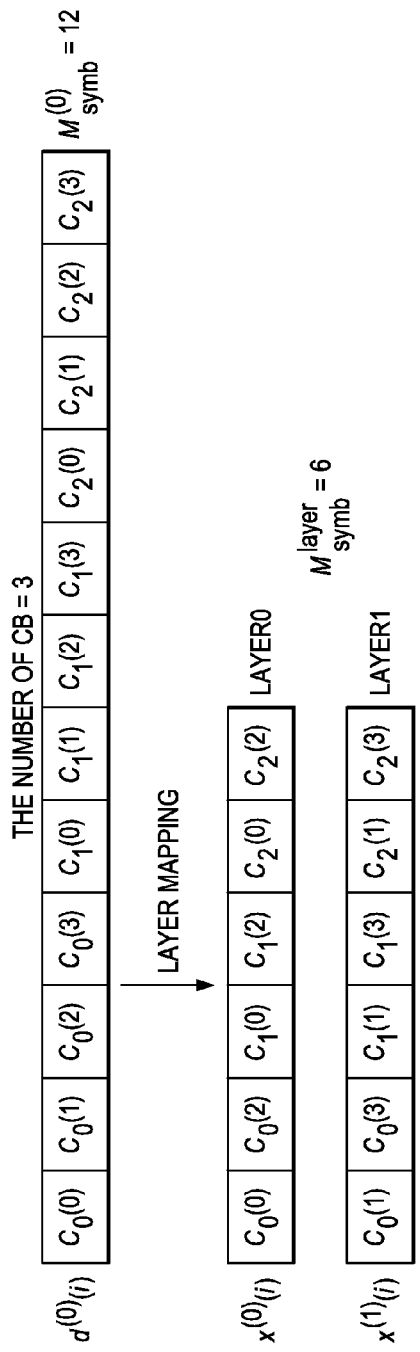
FIG. 3 is a diagram of codeword-to-layer mapping of one codeword comprising three code blocks into two layers.

When one TB consists of multiple CBs, the layer mapping methods shown in Table 1 may not be optimal because modulation symbols of each CB are allocated into the same resource elements of different layers. FIG. 3 illustrates a situation where one codeword comprising three CBs is mapped into two layers using the mapping shown in Table 1, with codeword 0 $d^{(0)}(i)$, where $i=0,1, \ldots, M_{symb}^{(0)}-1$, consists of three CBs $C_q(j)$, where $q=0,1,2$ and $j=0,1, \ldots, M_{symb}^{layer}-1$. As shown in FIG. 3, $M_{symb}^{(0)}$ and $M_{symb}^{layer}$ are set to 12 and six (6), respectively. Since the time-frequency location of resources of layer 0 for $C_0(0), C_0(2), C_1(0), C_1(2), C_2(0), C_2(2)$ is the same as that of layer 1 for $C_0(1), C_0(3), C_1(1), C_1(3), C_2(1), C_2(3)$, a SIC receiver cannot be used to improve link quality and it would experience performance degradation.

Currently, 3GPP is developing UL-MIMO to improve the spectral efficiency and peak data rate of LTE uplink in its discussion of LTE-Advanced (LTE-A). UL transport channel processing, which generate the codeword for transport block, is somewhat different from the DL procedure shown in FIG. 1. UL processing described for transport channel processing and physical channel processing in a LTE communications system will be modified to allow for UL MIMO in LTE-A.

Figure 4:
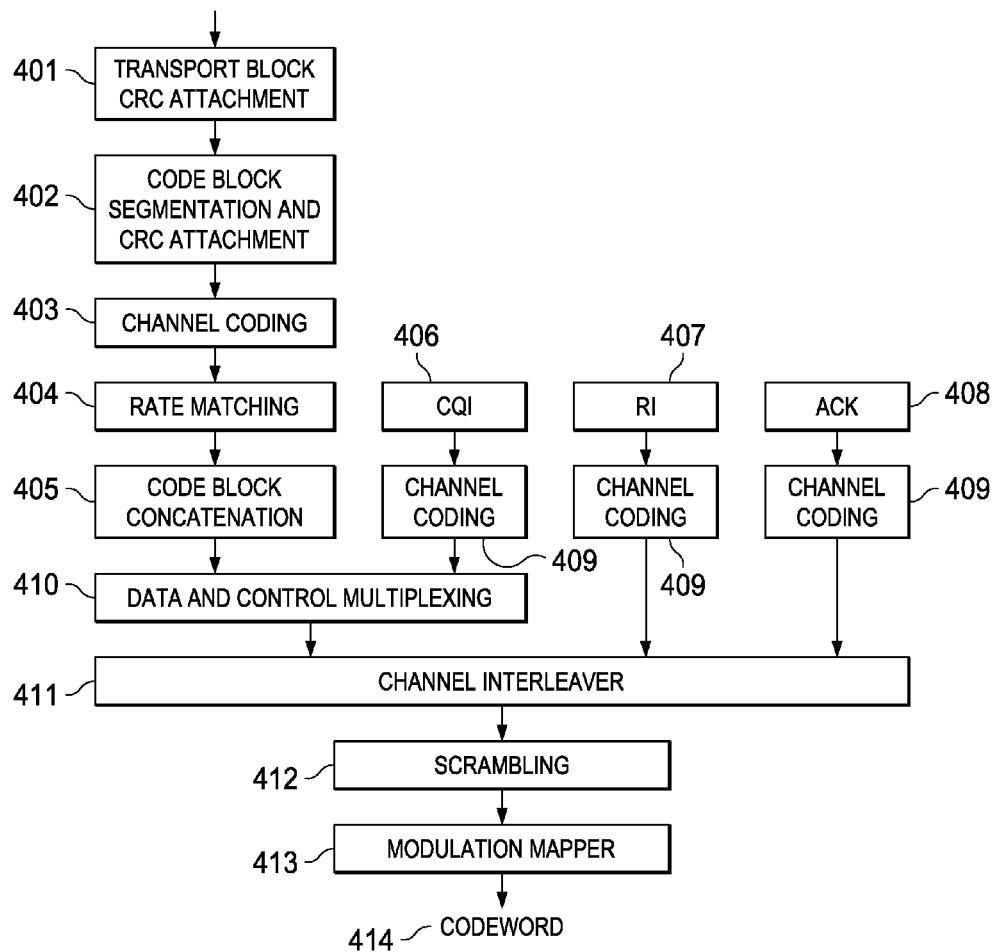
FIG. 4 is a flow diagram of transport channel processing in a LTE UL communications system.

FIG. 4 illustrates transport channel processing in a LTE communications system. First, a TB is input and cyclic redundancy check (CRC) bits are attached to the TB at a Transport Block CRC attachment unit 401 for each TB. In a Code Block Segmentation Code Block CRC attachment unit 402, a TB may be split into multiple code blocks (CB) and CB-level CRC bits are attached to each CB if size of TB is larger than the preset threshold to reduce the complexity of encoder and decoder. If the TB is not larger than the preset threshold, then Code block Segmentation Code block CRC attachment unit 402 may not be needed.

Then, each CB is turbo-encoded in a Channel Coding unit 403 for error correction in receiver. In a Rate matching unit 404, the coded bits of each CB is interleaved and the redundancy version (RV) for hybrid automatic repeat request (HARM) is generated. If there are multiple code blocks (CBs) in one TB, they are concatenated in a Code block concatenation unit 405.

Unlike the DL case, some control information such as the channel quality indicator (CQI) from a CQI unit 406, the rank indicator (RI) from a RI unit 407, and the acknowledgement (ACK) for DL HARQ from an ACK unit 408 may be multiplexed with transport channel in the uplink. Before multiplexing control channel, each control channel is channel-encoded in a Channel Coding unit 409. The coded bits of TB and CQI are first multiplexed in a Data and Control multiplexing unit 410 in such way that the code block of CQI is followed by the CBs of a TB. Multiplexed bits are interleaved with the coded bits of RI unit 407 and ACK unit 408 together in a Channel Interleaver unit 411.

Then, the interleaved symbols to be transmitted are scrambled in a Scrambling unit 412 and the scrambled bits are modulated into complex symbols using Quadrature Phase Shift Keying (QPSK), 16 Quadrature Amplitude Modulation (QAM) or 64-QAM in a Modulation Mapper unit 413 and formed into a complex-valued codeword 414.

Figure 5:
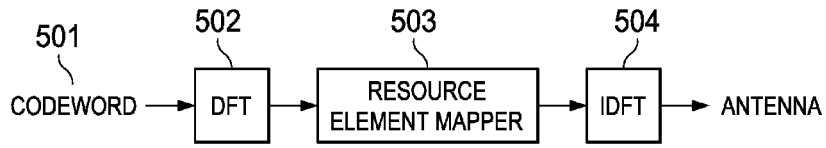
FIG. 5 is a diagram of physical channel processing in a LTE UL communications system.

FIG. 5 illustrates physical channel processing in a LTE UL communications system. Since single carrier frequency division multiple access (SC-FDMA) is used for UL transmission, the codeword symbols generated in transport channel processing shown in FIG. 4 are processed with the discrete Fourier transform (DFT). Complex-valued codeword symbols 501 are input to a DFT unit 502 to convert the time-domain signal to the frequency-domain signal. The frequency domain signal is mapped to frequency-time domain resource by a Resource Element Mapper 503 and transmitted through antenna after performing an inverse DFT (IDFT) by an IDFT unit 504.

Figure 6:
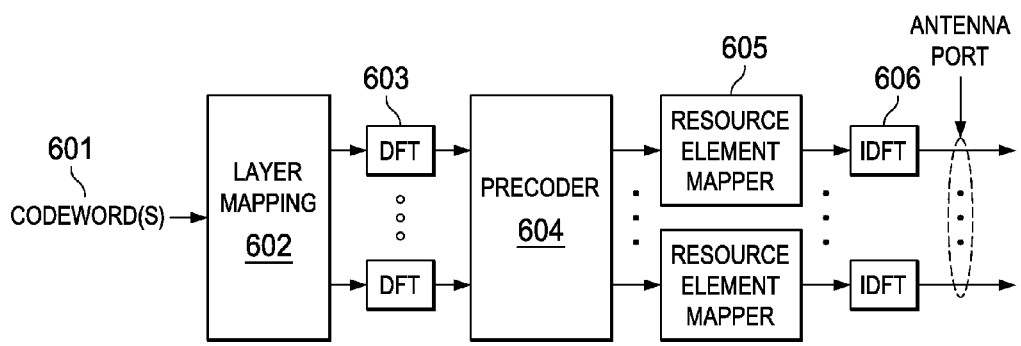
FIG. 6 is a diagram of physical channel processing to support uplink MIMO in a LTE-A communications system.

FIG. 6 illustrates physical channel processing to support UL MIMO in a LTE-A communications system. While a LTE UL communications system transmits at most one TB over one layer per transmission time interval (TTI), up to 2 TBs may be transmitted over 4 layers in a LTE-A communications system using UL MIMO. Consequently up to two codewords may be transmitted in FIG. 6. Complex-valued codeword symbols 601 may be fed into a Layer Mapping unit 602. The complex-valued signal of each layer is converted into frequency domain signal by a DFT unit 603 where there is one DFT block for each layer.

Then, a precoder unit 604 takes as input the vector comprising one symbol from each layer and generates a block of vectors to be mapped onto resources on the multiple antenna ports. In a Resource Element Mapper unit 605, the precoded symbols are mapped into time-frequency domain resource elements of each antenna port and then converted to time-domain signal after performing an inverse DFT (IFFT) in an IDFT unit 606.

The process illustrated in FIG. 6 may be modified slightly without departing from the principle of the technique. For example, an extra step such as layer shifting may be added between DFT unit 603 and precoder unit 604 to introduce diversity. Such modification does not alter the need to provide proper channel interleaver and codeword-to-layer mapping to facilitate a SIC receiver.

Figure 7:
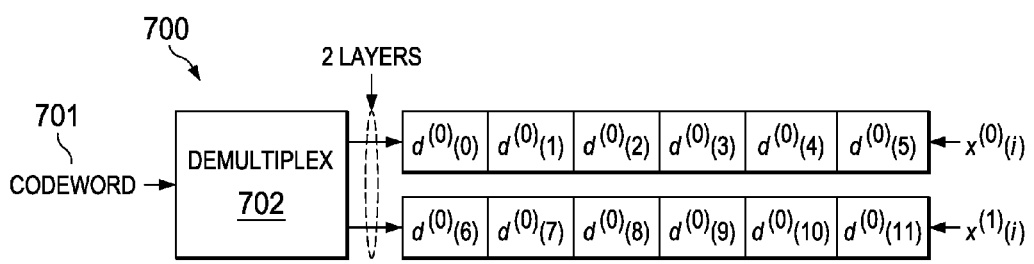
FIG. 7 is a diagram of a codeword-to-layer mapping module.

If the UL uses the same layer mapping as the DL, then it may have the same problem with SIC receiver as discussed previously if one TB consists of several CBs. Thus a layer mapping unit different from the DL is designed. FIG. 7 illustrates a codeword-to-layer mapping module 700. An input codeword 701, $d^{(0)}(0), d^{(0)}(1), \ldots, d^{(0)}(11)$, may be fed into layer mapping module 700 and the input sequence is demultiplexed in a Demultiplex unit 702 such that the first half of the codeword (e.g., $d^{(0)}(0), d^{(0)}(1), \ldots, d^{(0)}(5)$) is mapped into a first layer and second half of codeword (e.g., $d^{(0)}(5), d^{(0)}(1), \ldots, d^{(0)}(11)$) is mapped into a second layer.

Figure 8:
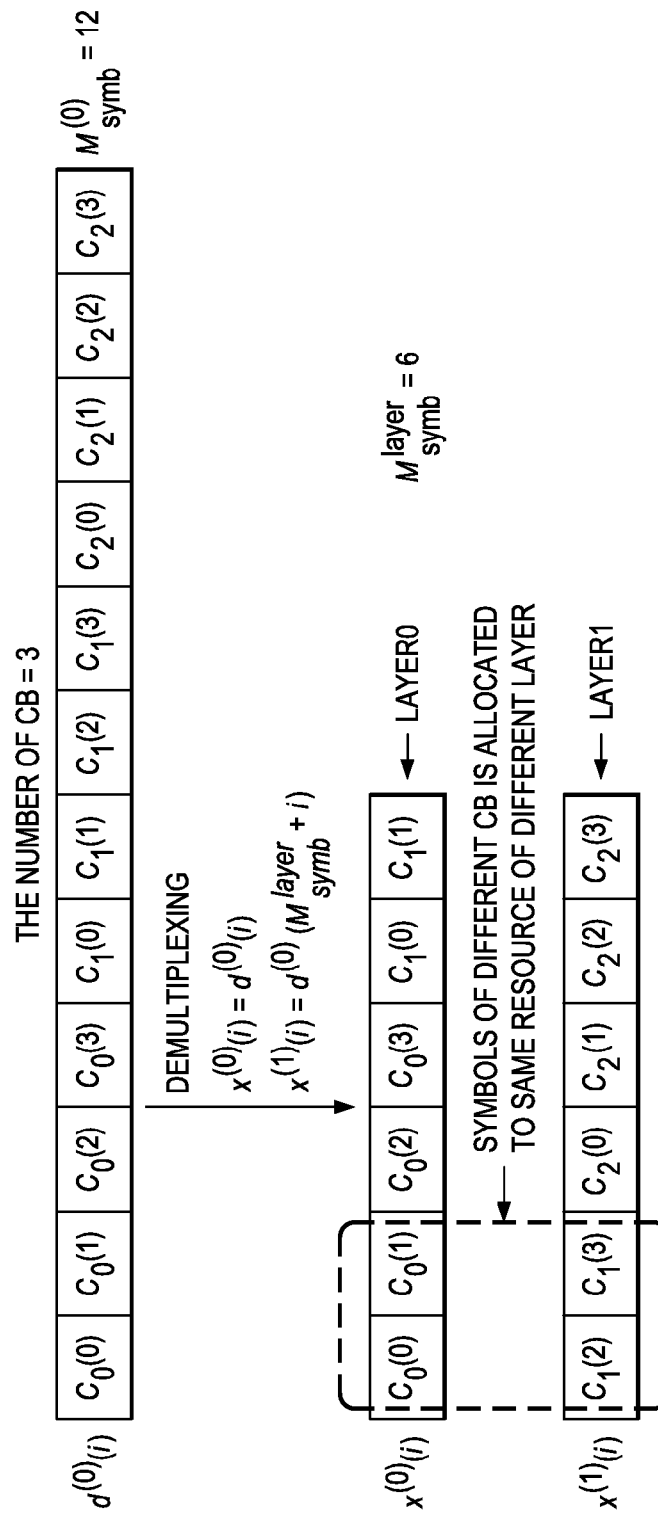
FIG. 8 is a diagram of a detailed view of the codeword-to-layer mapping illustrated in FIG. 7.

FIG. 8 illustrates a detailed view of the codeword-to-layer mapping illustrated in FIG. 7, wherein one codeword consists of three CBs and is mapped into two layers. As shown in FIG. 8, codeword symbols of the same CB are not allocated to the same resource of the other layer unlike the example shown in FIG. 3. The description focuses mainly on a situation where one TB maps to two layers, since in LTE-A UL, a TB can be mapped to at most two layers, even for a channel having three or four layers.

Table 2 shows codeword-to-layer mapping rule for a number of different codeword and layer combinations which is illustrated in the codeword-to-layer mapping module shown in FIGS. 7 and 8. Codeword-to-layer mapping rules such as shown in Table 2 facilitate the implementation of a SIC receiver.

The codeword-to-layer mappings shown in Table 2 and FIGS. 7 and 8 strive to keep the modulation symbols of a CB within a single layer as much as possible, assuming the absence of channel interleaver unit 411 of FIG. 4. However, they cannot be used directly on the UL as shown in FIG. 4 because the UL is likely to have Channel interleaver unit 411 located before codeword-to-layer mapping.

Figure 9:
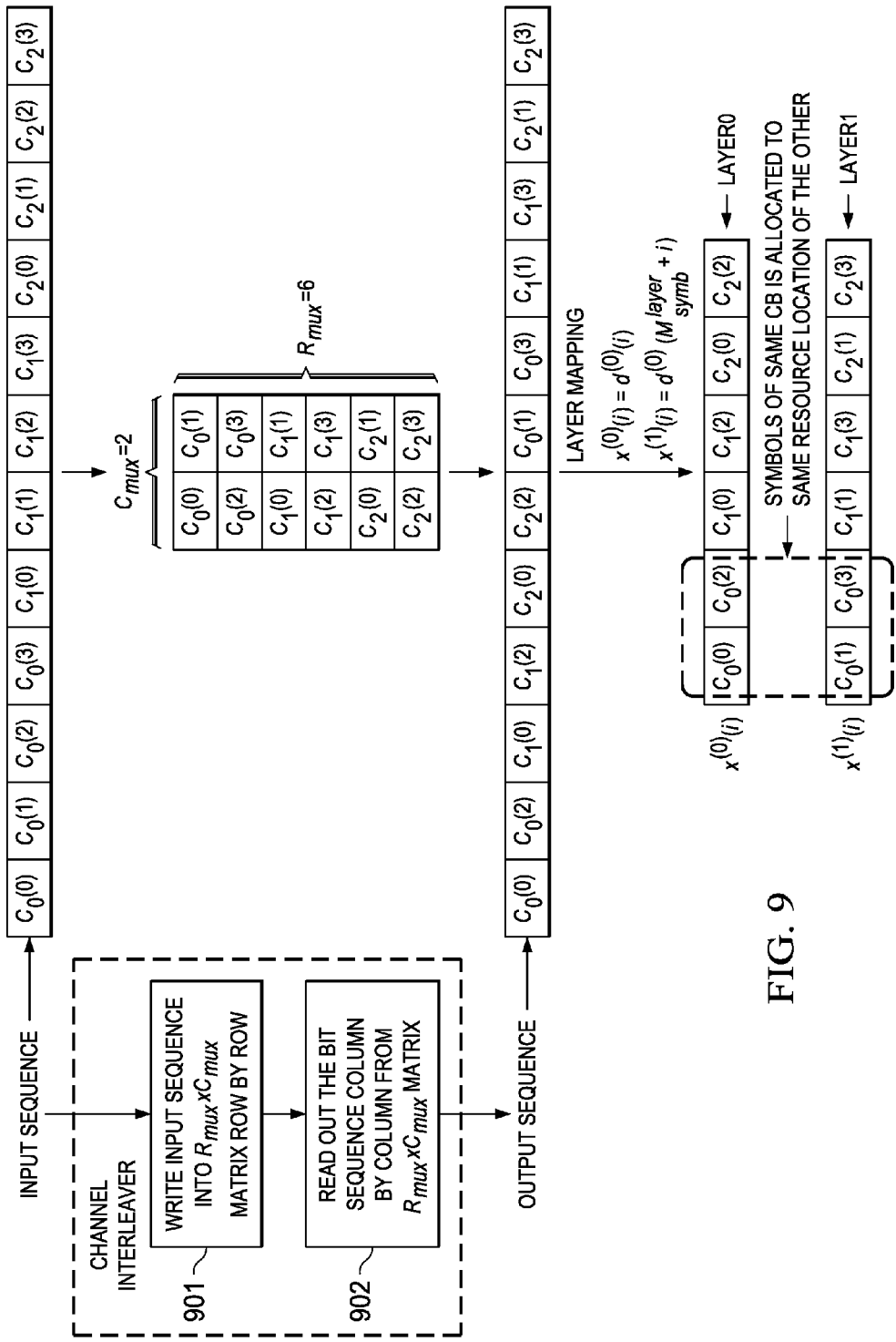
FIG. 9 is a diagram of the operations of channel interleaver and layer mapping method.

FIG. 9 illustrates the combined operation of channel interleaver and layer mapping method shown in Table 2, where the LTE-style block channel interleaver of UL is assumed present. As will be made clear later, the straightforward block channel interleaver shown in FIG. 9 does not facilitate a SIC receiver, while a channel interleaver comprising M parallel sub-channel interleavers discussed later provides support for a SIC receiver. Here M is equal to the number of layers a TB is mapped into.

As shown in FIG. 9, a scrambling unit (such as scrambling unit 412 of FIG. 4) and a modulation mapper unit (such as modulation mapper unit 413 of FIG. 4) are omitted in FIG. 9 for simplicity because they do not impact a relationship between layer mapping and channel interleaver. Furthermore, the control information such as CQI, RI, and ACK is omitted in channel interleaver operation because their impact on the data channel is negligible.

Referring to FIG. 9, an input sequence consisting of three CBs is fed into a channel interleaver unit and is written into a matrix of size $R_{mux} \times C_{mux}$ row by row (block 901), where $C_{mux}$ is the number of SC-FDMA symbols carrying the uplink data and $R_{mux}$ is equal to dividing the size of input sequence by $C_{mux}$. In the example illustrated in FIG. 9, $C_{mux}=2$, $R_{mux}=6$. The output of interleaver is a bit sequence read out column by column from the matrix of size $R_{mux} \times C_{mux}$ (block 902). Note that bit sequence is used in this example for simplicity, which can be understood as using BPSK as the modulation. In LTE/LTE-A, a sequence of bit groups is channel-interleaved in general, where a bit group corresponds to a modulation symbol. After performing a layer mapping according to Table 2, for example, the codeword symbols of the same CB are allocated to same time-frequency resource of the spatial layers unlike the case without a channel interleaver unit as shown in FIG. 8. Therefore, SIC cannot be used at a receiver to improve the link quality. Indicates that the channel interleaver design of LTE should be modified from that defined in LTE (which is illustrated by 901 and 902 in FIG. 9).

Figure 10:
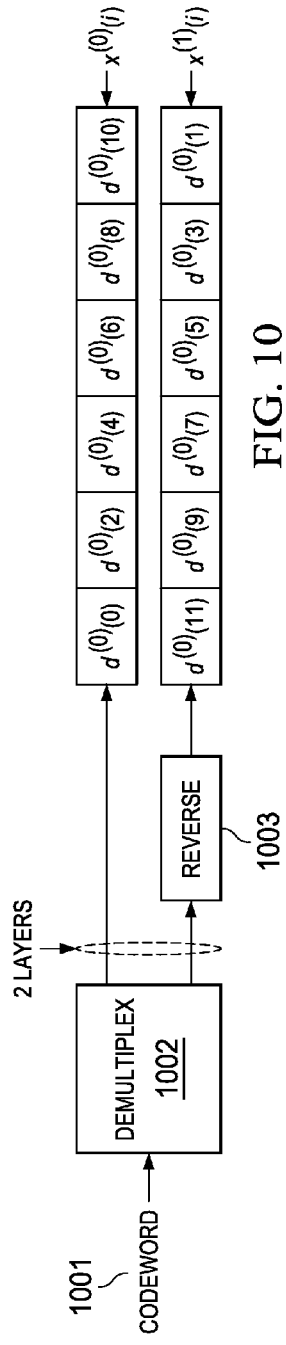
FIG. 10 is a diagram of a codeword-to-layer mapping.

FIG. 10 illustrates another embodiment of codeword-to-layer mapping. An input codeword 1001, $d^{(0)}(0), d^{(0)}(1), \ldots, d^{(0)}(11)$, which is channel-interleaved, is fed into layer mapping module and the input sequence is demultiplexed in a Demultiplex unit 1002 in such a way that the first half of codeword is mapped into the first layer and the second half of codeword is mapped into the second layer. Then, the codeword symbols mapped into the second layer are rearranged in such a way that the order of sequence is reversed by reverse unit 1003.

TABLE 2

Codeword-to-layer mapping according to module shown in FIGS. 7 and 8.

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(i)$<br>$x^{(1)}(i) = d^{(0)}(M_{symb}^{layer} + i)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(i)$<br>$x^{(2)}(i) = d^{(1)}(M_{symb}^{layer} + i)$ | $M_{symb}^{layer} = M_{symb}^{(0)} = M_{symb}^{(1)}/2$ |
| 4 | 2 | $x^{(0)}(i) = d^{(0)}(i)$<br>$x^{(1)}(i) = d^{(0)}(M_{symb}^{layer} + i)$<br>$x^{(2)}(i) = d^{(1)}(i)$<br>$x^{(3)}(i) = d^{(1)}(M_{symb}^{layer} + i)$ | $M_{symb}^{layer} = M_{symb}^{(0)}/2 = M_{symb}^{(1)}/2$ |

Figure 11:
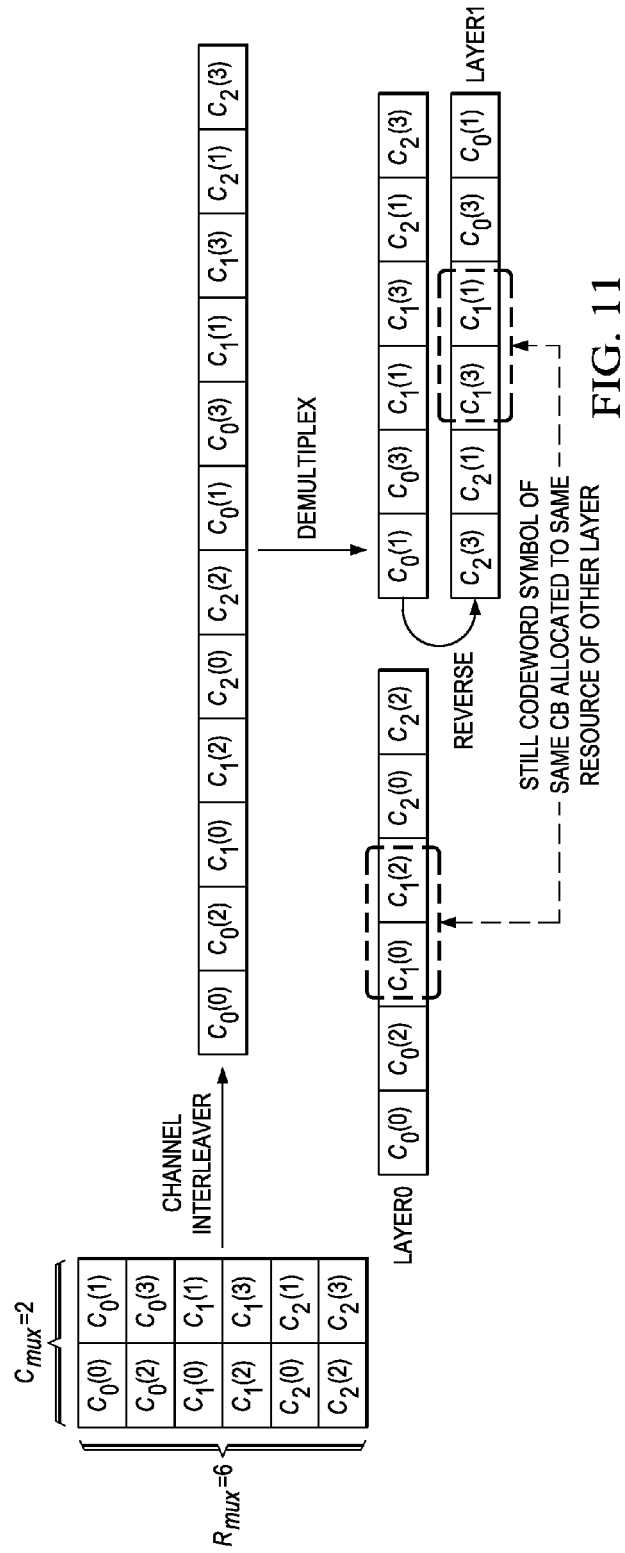
FIG. 11 is a diagram of a detailed view of the codeword-to-layer mapping illustrated in FIG. 10.

FIG. 11 illustrates a detail example of the codeword-to-layer mapping shown in FIG. 10. The output sequence of channel interleaver shown in FIG. 9 is used as input sequence of the layer mapping. Symbols of the channel interleaver output sequence is mapped into the first resource of first layer, the second symbol is mapped into the second resource of first layer and so on while last symbol of channel interleaver output sequence is mapped into first resource of second layer and second last symbol is mapped into second resource of second layer and so on. Mathematical expressions of the codeword-to-layer mapping are shown in Table 3. However, this codeword-to-layer mapping results in some codeword symbols of some CBs are allocated to same resource of other layer as shown in FIG. 11.

Figure 14:
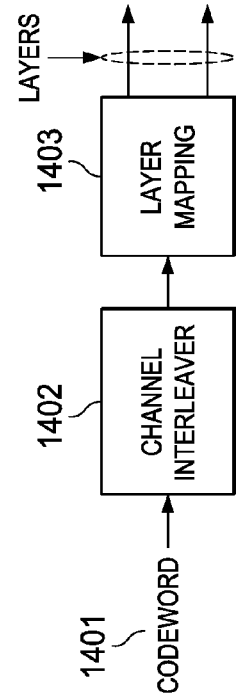
FIG. 14 is a diagram of a codeword-to-layer mapping to maintain modulation symbols belonging to a code block on a single layer in the presence of a channel interleaver.

FIG. 14 illustrates a codeword-to-layer mapping with intent to maintain the modulation symbols belonging to a CB on a same layer as much as possible, in the presence of the channel interleaver. As shown in FIG. 14, a codeword 1401 may be channel-interleaved in a Channel Interleaver unit 1402, where codeword 1401 may be already scrambled and modulated through a Scrambling unit 412 and a Modulation Mapper unit 413, for example. Moreover, the operations performed by Scrambling unit 412 or Modulation Mapper unit 413 can be performed after Channel Interleaver unit 1402 or a Layer Mapping unit 1403. Channel-interleaved symbols are mapped into the predetermined layers in Layer Mapping unit

TABLE 3

Codeword-to-layer mapping according to module shown in FIGS. 10 and 11.

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(i)$<br>$x^{(1)}(i) = d^{(0)}(2M_{symb}^{layer} - i)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(i)$<br>$x^{(2)}(i) = d^{(1)}(2M_{symb}^{layer} - i)$ | $M_{symb}^{layer} = M_{symb}^{(0)} = M_{symb}^{(1)}/2$ |
| 4 | 2 | $x^{(0)}(i) = d^{(0)}(i)$<br>$x^{(1)}(i) = d^{(0)}(2M_{symb}^{layer} - i)$<br>$x^{(2)}(i) = d^{(1)}(i)$<br>$x^{(3)}(i) = d^{(1)}(2M_{symb}^{layer} - i)$ | $M_{symb}^{layer} = M_{symb}^{(0)}/2 = M_{symb}^{(1)}/2$ |

Figure 12:
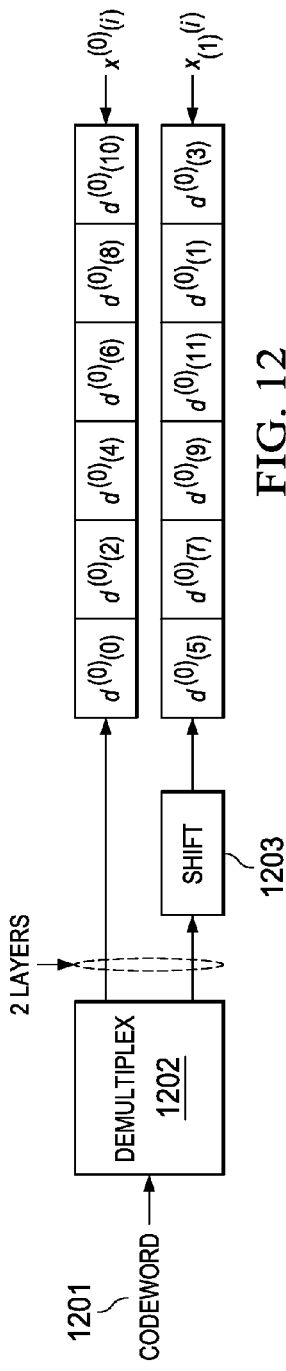
FIG. 12 is a diagram of a codeword-to-layer mapping.

FIG. 12 illustrates another embodiment of codeword-to-layer mapping. An input codeword 1201, $d^{(0)}(0)$, $d^{(0)}(1), \ldots, d^{(0)}(11)$, which is channel-interleaved, is fed into layer mapping module and the input sequence is demultiplexed in a Demultiplex unit 1202 in a manner similar to what is shown in FIGS. 7 and 10. Codeword symbols mapped into the second layer are rearranged by shifting the sequence to the right or left in the buffer by a shift unit 1203. Shift unit 1203 may shift the sequence either to the right or the left by a specified number of symbols. As shown in FIG. 12, the sequence is shifted two symbols to the left (or four symbols to the right)

Figure 13:
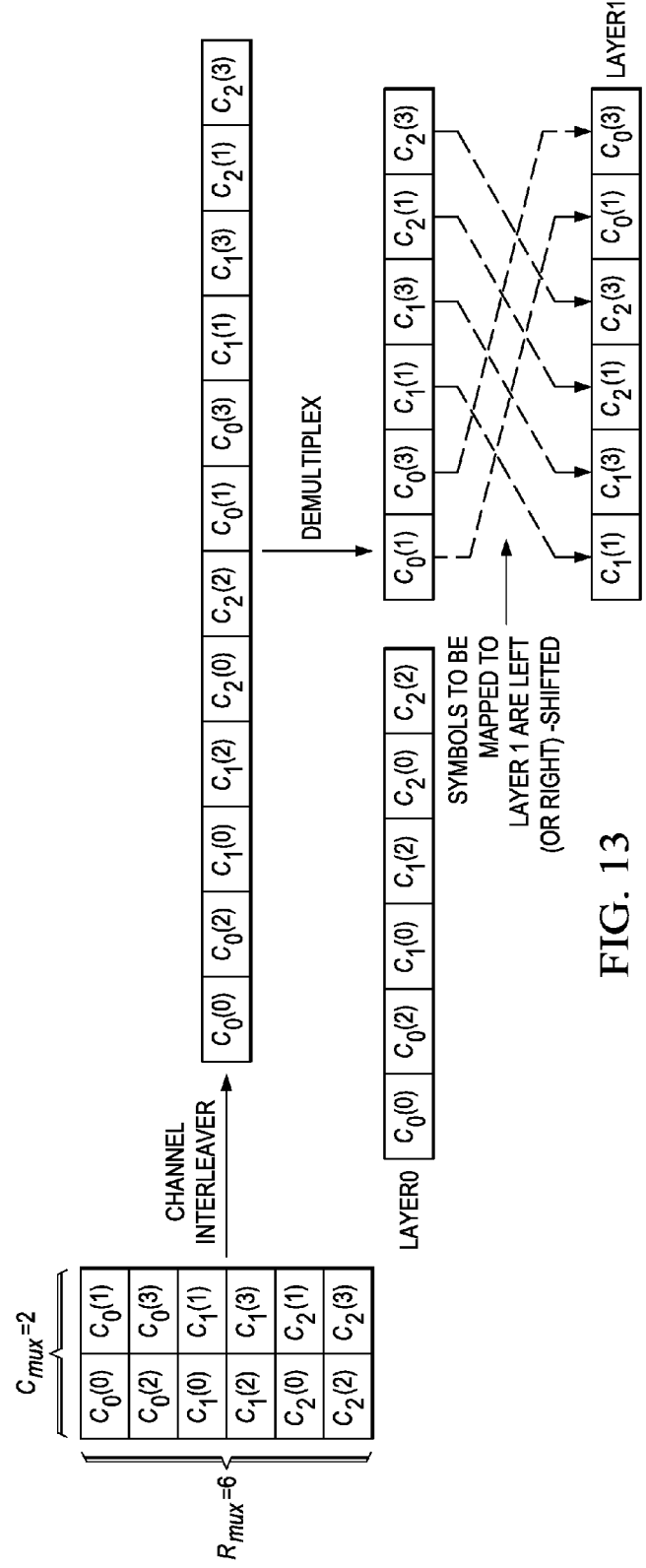
FIG. 13 is a diagram of a detailed view of the codeword-to-layer mapping illustrated in FIG. 12.

FIG. 13 illustrates a detailed example of the codeword-to-layer mapping shown in FIG. 12. The output sequence of channel interleaver shown in FIG. 9 is used as input sequence of the layer mapping. The input sequenced is split into two blocks, a first block is mapped into the first layer while the elements of a second block is circularly left (or right)-shifted by $R_{mux}/C$, where C is the number of code block per TB. Mathematical expressions of the codeword-to-layer mapping are shown in Table 4. As shown in FIG. 13, codeword symbols of same CBs are allocated to different resource of two different layers and it enable a SIC receiver to improve link quality.

1403 where any of a wide variety of methods of codeword-to-layer mapping presented herein may be employed for in Layer Mapping unit 1403.

Substantially, channel interleaver unit 1402 of FIG. 14 is composed of M parallel sub-channel interleavers, each of size $(R_{mux}/M \times C_{mux})$, where M is equal to the number of layers a TB is mapped into. In general, each of the sub-channel interleaver can be any type of interleaver (such as a block interleaver, bit reversal interleaver, and so forth). Furthermore, the sub-channel interleavers may be modulation-symbol or bit level interleavers. Although shown in FIG. 14 as being located immediately ahead of layer mapping unit 1403, channel interleaver unit 1402 may be placed in other positions before layer mapping unit 1403 with the same net effect. For example, channel interleaver unit 1402 may be placed in a position such as at the location of channel interleaver unit 411 shown in FIG. 4. While it is assumed that one codeword is used in FIG. 14, it is possible to formulate a channel interleaver unit for two codewords to achieve the same effect achieved for individual codewords. For example, if two codewords are being processed, the channel interleaver unit may effectively interleave each codeword separately, where the

TABLE 4

Codeword-to-layer mapping according to module shown in FIGS. 12 and 13 (C is the number of CB per TB)

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(i)$<br>$x^{(1)}(i) = d^{(0)}(M_{symb}^{layer} + (R_{mux}/C + i) \bmod M_{symb}^{layer})$ | $M_{symb}^{layer} = M_{symb}^{(0)}/2$ |
| 3 | 2 | $x^{(0)}(i) = d^{(0)}(i)$<br>$x^{(1)}(i) = d^{(1)}(i)$<br>$x^{(2)}(i) = d^{(1)}(M_{symb}^{layer} + (R_{mux}/C + i) \bmod M_{symb}^{layer})$ | $M_{symb}^{layer} = M_{symb}^{(0)} = M_{symb}^{(1)}/2$ |
| 4 | 2 | $x^{(0)}(i) = d^{(0)}(i)$<br>$x^{(1)}(i) = d^{(0)}(M_{symb}^{layer} + (R_{mux}/C + i) \bmod M_{symb}^{layer})$<br>$x^{(2)}(i) = d^{(1)}(i)$<br>$x^{(3)}(i) = d^{(1)}(M_{symb}^{layer} + (R_{mux}/C + i) \bmod M_{symb}^{layer})$ | $M_{symb}^{layer} = M_{symb}^{(0)}/2 = M_{symb}^{(1)}/2$ | individual channel interleaver of a single codeword is composed of $M_i$ parallel sub-channel interleavers, and $M_i$ is equal to the number of layers the i-th TB (i.e., codeword) is mapped onto.

Figure 15A:
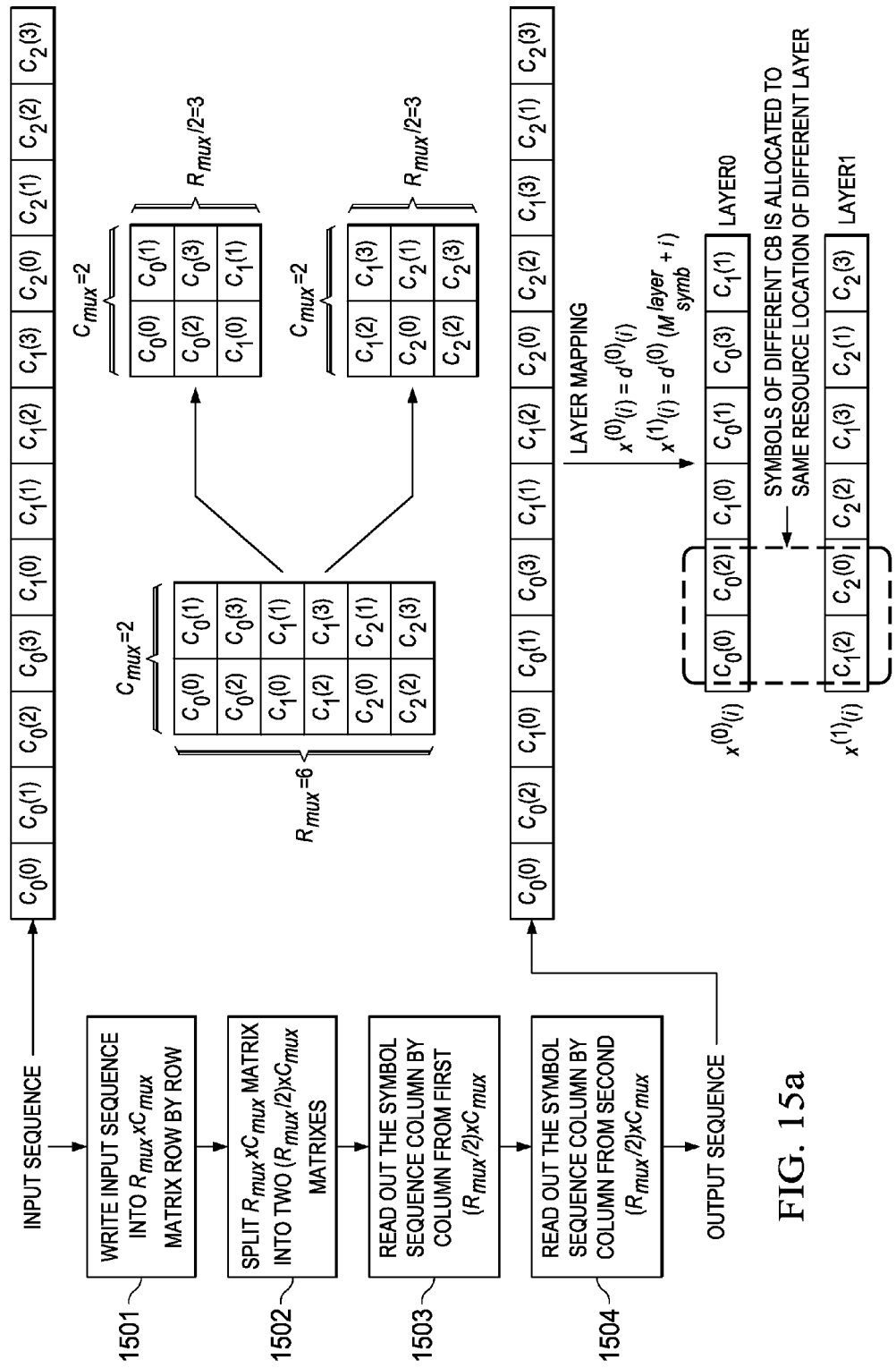
FIG. 15 is diagram of a detailed view of the codeword-to-layer mapping illustrated in FIG. 14.

FIG. 15a illustrates a detailed example of the channel interleaver and codeword-to-layer mapping shown in FIG. 14. As shown in FIG. 15a, an input sequence (i.e., a codeword, or the bit sequence of a TB) is mapped onto two layers, M=2. Although the discussion focuses on three CBs being mapped onto two layers, the embodiments may be applied to a wide variety of configurations. In general, a first number of CBs may be mapped onto a second number of layers, where the first number and the second number may be non-zero integer values and the first number may or may not be equal to the second number. Therefore, the discussion of three CBs mapped onto two layers should not be construed as being limiting to either the scope or the spirit of the embodiments.

An input sequence consisting of three CBs is fed into channel interleaver unit, such as channel interleaver unit 1402 and may be written (e.g., stored) into a matrix of size $R_{mux} \times C_{mux}$ (block 1501). The $R_{mux} \times C_{mux}$ matrix may be split into two matrixes whose dimension is $(R_{mux}/M \times C_{mux}) = (R_{mux}/2 \times C_{mux})$ (block 1502). A first half output of the channel interleaver is a symbol sequence read out column by column from a first $(R_{mux}/M \times C_{mux}) = (R_{mux}/2 \times C_{mux})$ matrix (block 1503) while a second half output of the channel interleaver is a symbol sequence read out column by column from a second $(R_{mux}/M \times C_{mux}) = (R_{mux}/2 \times C_{mux})$ matrix (block 1504). After using the codeword-to-layer mapping as specified in Table 2 and FIG. 7, codeword symbols of same CB are allocated to different resource locations of the different layers. The resources may then be transmitted.

In general, for a codeword mapped to M layers, the channel interleaver used is composed of M separate sub-channel interleavers, and the symbol sequence of the M sub-channel interleavers are read out and mapped to the M layers via the codeword-to-layer mapping unit, with the symbols of a sub-channel interleaver mapped to a layer. Furthermore, FIG. 15a illustrates the channel interleaving and codeword-to-layer mapping function of a single codeword. If there are more than one codeword to be processed for the time interval, each codeword goes through a similar processing as illustrated FIG. 15a.

Figure 15B:
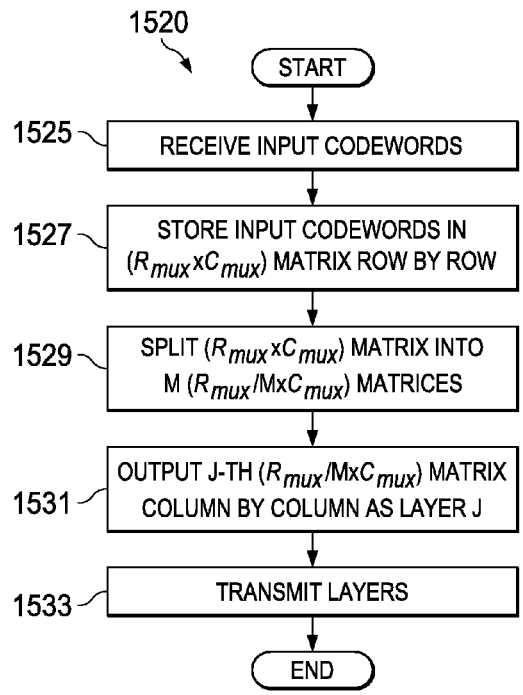

FIG. 15b illustrates a flow diagram of base station operations 1520 in transmitting information as shown in FIGS. 14 and 15a. Base station operations 1520 may be indicative of operations occurring in a base station as the base station transmitting information using the channel interleaving and codeword-to-layer mapping functions with intent to maintain the modulation symbols belonging to a CB on a same layer as much as possible. Base station operations 1520 may occur while the base station is in a normal operating mode.

Base station operations 1520 may begin with the base station receiving input codewords to be mapped onto M layers for transmission (block 1525). In general, the base station may receive one or more codewords to be mapped onto M layers, where M is less than or equal to a number of transmit antennas available at the base station.

Part of the codeword-to-layer mapping performed by the base station may require that an ordering of symbols in the codeword(s) be rearranged. One way to simply implement a rearrangement of the symbols in the codeword(s) may be to store the symbols of the codewords in a matrix of size $R_{mux} \times C_{mux}$ (block 1527). According to an embodiment, the symbols of the codeword(s) may be stored in the matrix in a row by row fashion, i.e., the symbols of the codeword(s) may be stored in the matrix by filling space in each row of the matrix before proceeding to a subsequent row of the matrix.

The $R_{mux} \times C_{mux}$ matrix may then be split into M matrices of size $R_{mux}/M \times C_{mux}$ (block 1529). The base station may then output each of the M matrices of size $R_{mux}/M \times C_{mux}$, wherein a J-th $R_{mux}/M \times C_{mux}$ matrix contains symbols for a J-th layer (block 1531). According to an embodiment, each of the M matrices of size $R_{mux}/M \times C_{mux}$ may be outputted in column by column order, i.e., all of the symbols in a column of the J-th $R_{mux}/M \times C_{mux}$ matrix may be read out prior to proceeding to a subsequent column. The symbols outputted from a $R_{mux}/M \times C_{mux}$ matrix may be allocated to different resource locations of a particular layer, such as described in Table 2 and FIG. 7. The layers may then be transmitted by the base station (block 1533). The layers may undergo additional processing prior to transmission, which may include layer mapping, scrambling, modulation mapping, and so forth. Base station operations 1520 may then terminate. Note that by using the per-layer sub-channel interleavers, separate channel interleaving for each codeword is realized as well since two codewords always occupy different layers.

Figure 15C:
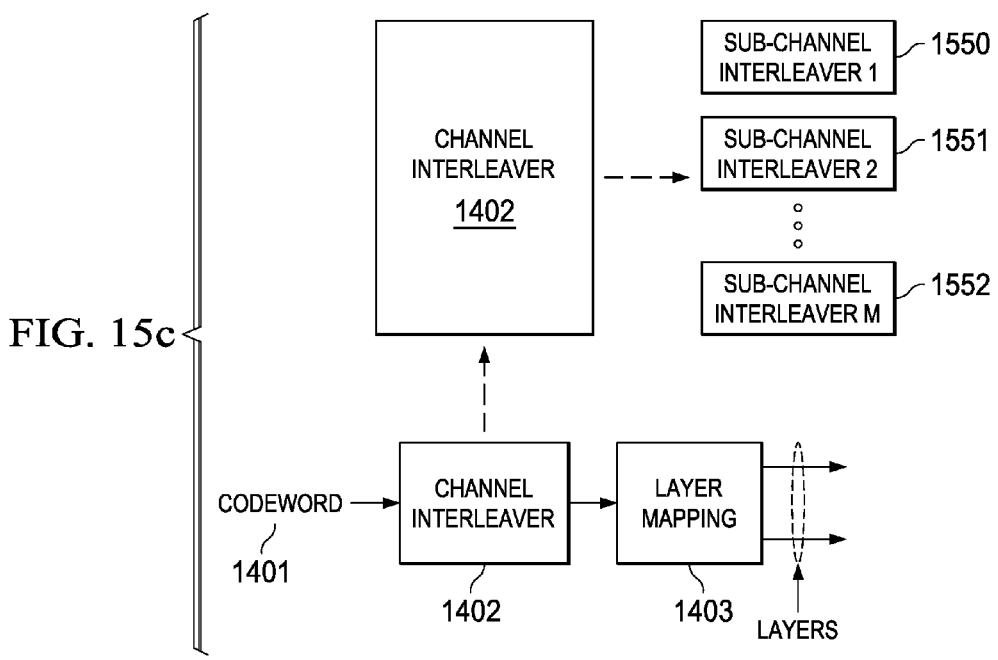

FIG. 15c illustrates a detailed view of a multi-layer channel interleaver. A channel interleaver to implement the codeword-to-layer mapping with intent to maintain the modulation symbols belonging to a CB on a same layer as much as possible, such as discussed in FIGS. 14, 15a, and 15b may be implemented as multiple sub-channel interleavers. As shown in FIG. 15c, channel interleaver 1402 may be implemented as M sub-channel interleavers, such as sub-channel interleaver 1 1550, sub-channel interleaver 2 1551, and sub-channel interleaver M 1552, where M is a number of layers that input codeword(s) is to be mapped onto.

Each of the sub-channel interleavers may be implemented as a memory of sufficient size to store a matrix of size $R_{mux}/M \times C_{mux}$. According to an embodiment, the memory used to implement a sub-channel interleaver may be larger than a minimum necessary to store a matrix of size $R_{mux}/M \times C_{mux}$ so that different values of M may be supported as well as different sized codeword(s). While block interleaver is used as an example here, other types of channel interleavers may also be used in each of the M sub-channel interleavers.

Figure 15D:
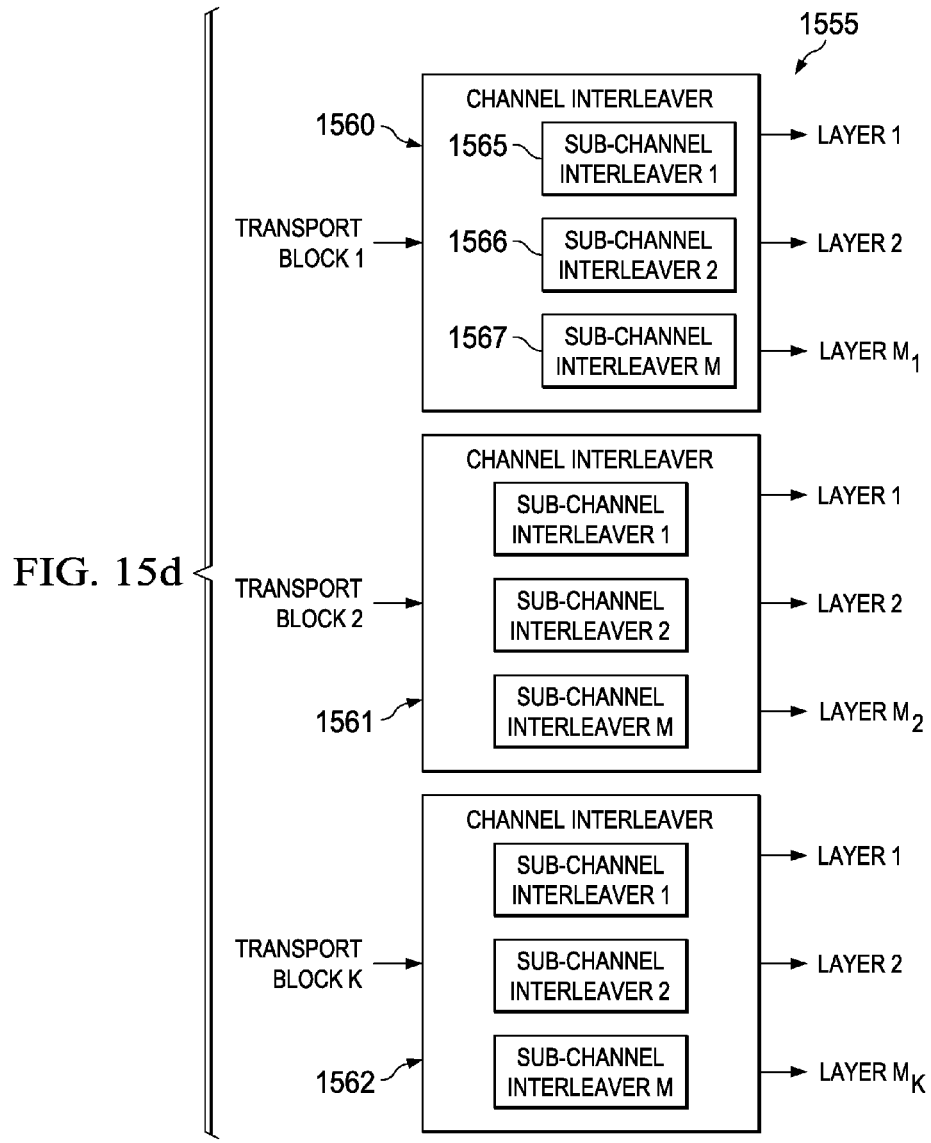

FIG. 15d illustrates a detailed view of a multi-layer channel interleaver 1555 for use with multiple transport blocks. In situations where multiple transport blocks are to be mapped onto multiple layers, multi-layer channel interleaver 1555 may include multiple sub-channel interleavers with one or more sub-channel interleaver used for each of the transport blocks. As shown in FIG. 15d, the i-th transport blocks may be mapped onto $M_i$ layers using the i-th multi-layer channel interleavers, i=1, ..., K, such as multi-layer channel interleavers 1560 through 1562. Here $M_1 + M_2 ... + M_K = M$, where M is the total number of available spatial layers. In turn, each of the multi-layer channel interleaver may include $M_i$ sub-channel interleavers. For example, multi-layer channel interleaver 1560 includes $M_1$ sub-channel interleavers 1565 through 1567.

It may be possible for each of the transport blocks to be mapped onto a different number of layers. For example, transport block 1 may be mapped onto one layer, transport block 2 may be mapped onto to two layers, and transport block K may be mapped onto one layer, and so forth.

Although the multi-layer channel interleavers of multi-layer channel interleaver 1555 may map transport blocks to a different number of layers, each multi-layer channel interleaver may include the same number of sub-channel interleavers, i.e., each multi-layer channel interleaver may include $M_1$ sub-channel interleavers, where $M_1$ is a maximum number of layers that a single transport block may be mapped onto.

Figure 16:
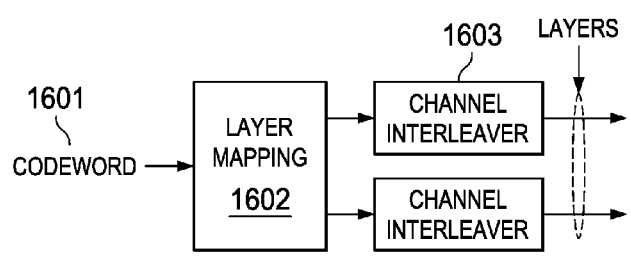
FIG. 16 is a diagram of a codeword-to-layer mapping.

FIG. 16 illustrates another embodiment of codeword-to-layer mapping, wherein the codeword-to-layer mapping cooperates with a channel interleaver, where the channel interleaver operates on the output of the codeword-to-layer mapping unit. A codeword(s) 1601 (similar to codeword(s) 1401 as discussed previously) is mapped into predetermined layers at a Layer Mapping unit 1602, where any type of Layer Mapping technique described in previously can be employed. Codeword symbols mapped into each layer are further channel-interleaved using a Channel Interleaver unit 1603. As shown in FIG. 16, a scrambling unit and a modulation mapper unit are omitted because they do not impact the operation of layer mapping with the channel interleaver.

Figure 17:
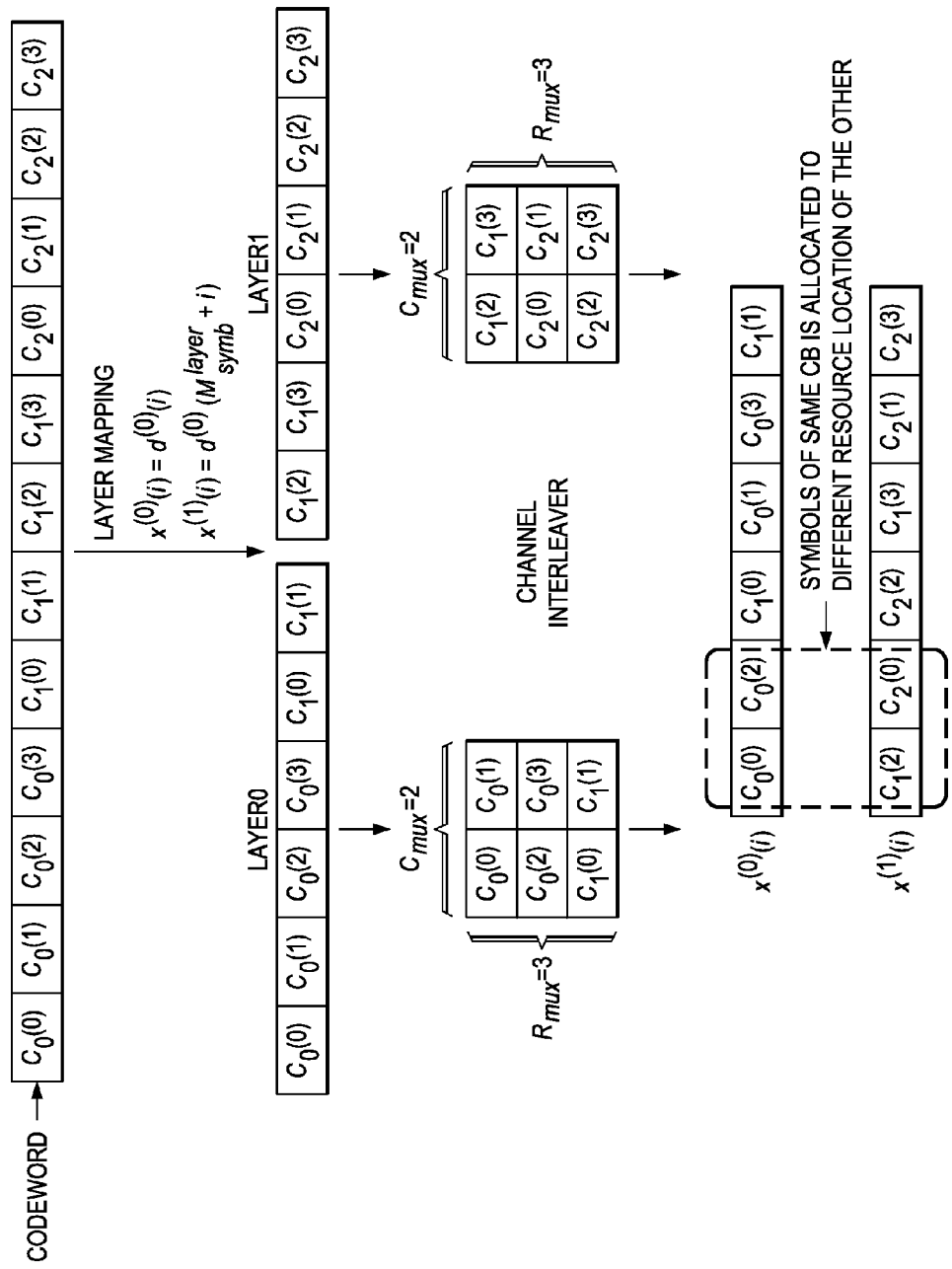
FIG. 17 is a diagram of a detailed view of the codeword-to-layer mapping illustrated in FIG. 16.

FIG. 17 illustrates a detailed example of the codeword-to-layer mapping shown in FIG. 16. An input codeword, $C_0(0)$, $C_0(1)$, $C_0(2)$, $C_0(3)$, $C_1(0)$, $C_1(1)$, $C_1(2)$, $C_1(3)$, $C_2(0)$, $C_2(1)$, $C_2(2)$, $C_2(3)$, which corresponds to codeword 1601 in FIG. 16, is demultiplexed in a manner as shown in Table 2, and FIGS. 7 and 8, and then mapped into the predetermined layers. Then, first half of input codeword, $C_0(0)$, $C_0(1)$, $C_0(2)$, $C_0(3)$, $C_1(0)$, $C_1(1)$, is mapped into layer 0 and the other half of the input codeword, $C_1(2)$, $C_1(3)$, $C_2(0)$, $C_2(1)$, $C_2(2)$, $C_2(3)$, is mapped into layer 1. The codeword in each layer is channel-interleaved individually. The interleaved symbols of layer 0 become $C_0(0)$, $C_0(2)$, $C_1(0)$, $C_0(1)$, $C_0(3)$, $C_1(1)$ and the interleaved symbols of layer 1 become $C_1(2)$, $C_2(0)$, $C_2(2)$, $C_1(3)$, $C_2(1)$, $C_2(3)$, respectively. Then, eventually codeword symbols belonging to same CB is allocated to different resource in different layer as shown FIG. 17, which enables the use of SIC to improve link quality.

Figure 18:
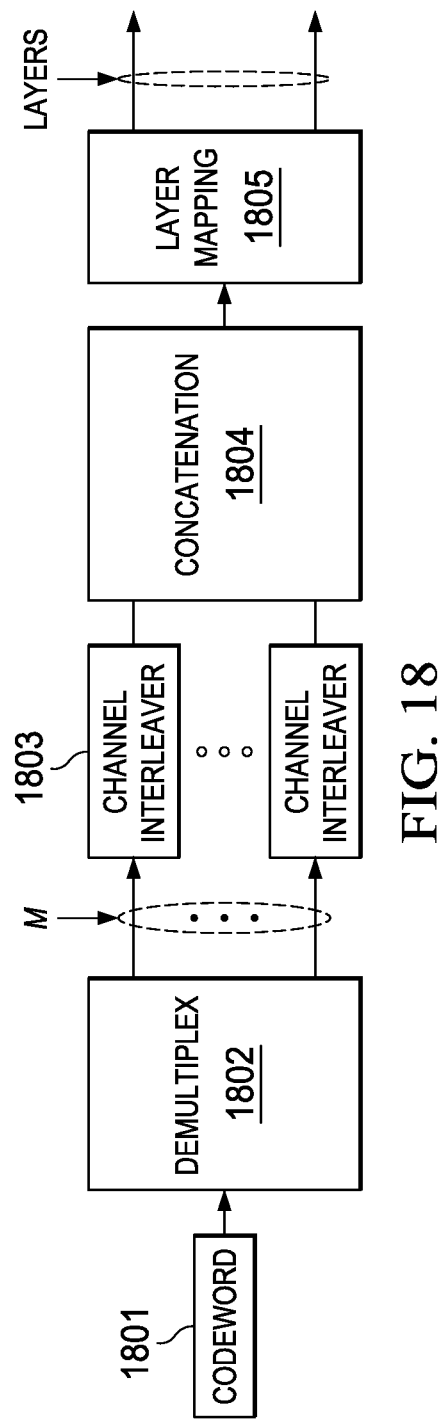
FIG. 18 is a diagram of a codeword-to-layer mapping and channel interleaver to maintain modulation symbols belonging to a code block on a single layer.

FIG. 18 illustrates another embodiment performing same operation as an embodiment shown in FIG. 14. As shown in FIG. 18, a codeword 1801 is demultiplexed into M streams by Demultiplex unit 1802 and each stream is channel-interleaved in a Channel Interleaver unit 1803, where codeword may be already scrambled and modulated through a Scrambling unit 412 and a Modulation Mapper unit 413. Moreover, the operations performed by Scrambling unit 412 or Modulation Mapper unit 413 can be performed after Channel Interleaver unit 1803 or a Layer Mapping unit 1805. Then, channel-interleaved symbols are concatenated into one output block in Concatenation unit 1804 and the concatenated symbols are mapped into the predetermined layers in Layer Mapping unit 1805 where any of a wide variety of methods of codeword-to-layer mapping presented herein may be employed for in Layer Mapping unit 1805.

Figure 19:
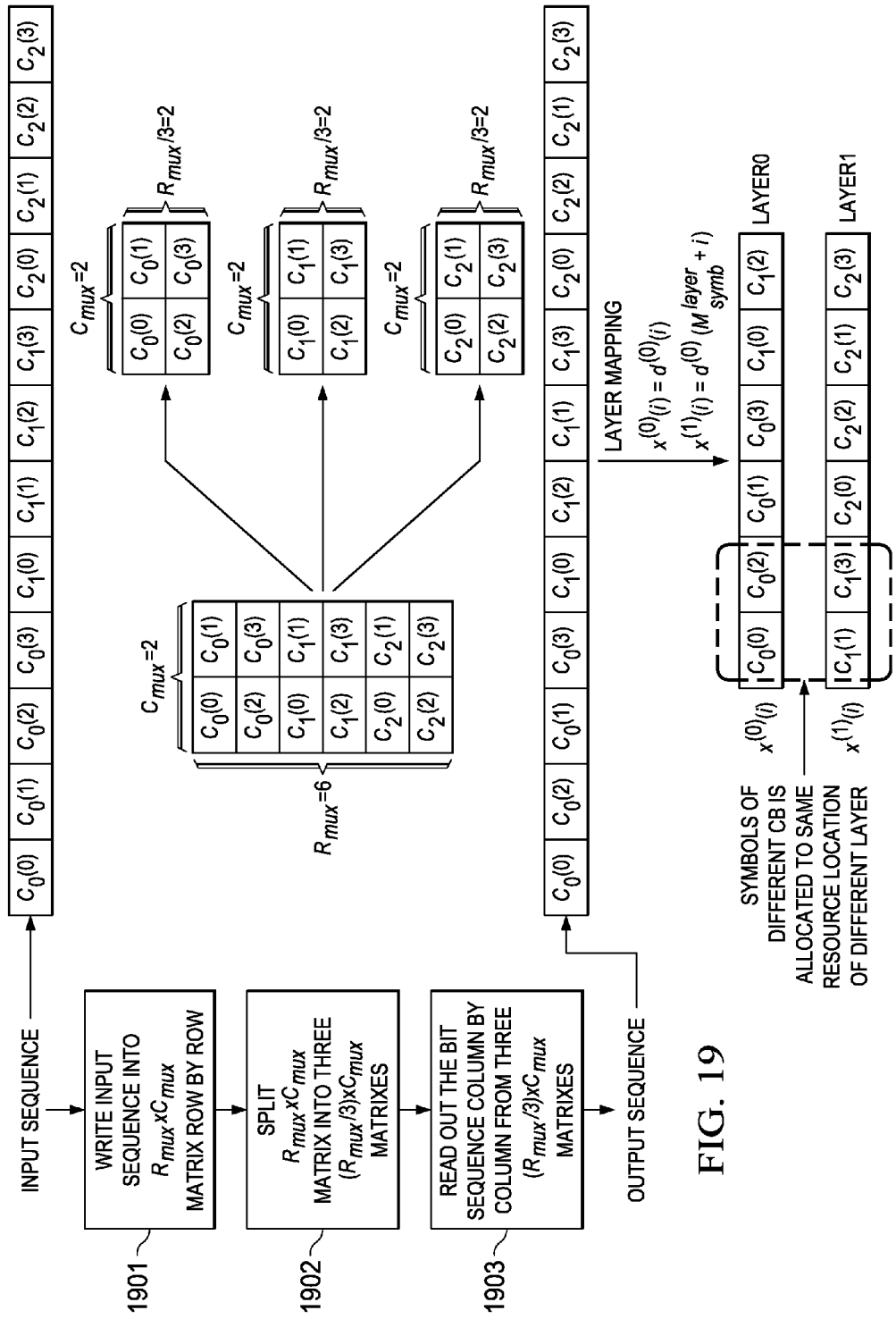
FIG. 19 is diagram of a detailed view of the codeword-to-layer mapping illustrated in FIG. 14 when the number of sub-channel interleaver is equal to the number of code blocks.

FIG. 19 illustrates a detailed example of the codeword-to-layer mapping shown in FIG. 14, where the channel interleaver is split into three sub-channel interleavers. An input sequence consisting of three CBs is fed into channel interleaver block and is written into a matrix of size $R_{mux} \times C_{mux}$ (block 1901). The $R_{mux} \times C_{mux}$ matrix is split into three matrixes whose dimension is $(R_{mux}/3 \times C_{mux})$ (block 1902). A output of the channel interleaver is the bit sequence read out column by column from three $(R_{mux}/3 \times C_{mux})$ matrix (block 1903) in such way that first one-third output block from first sub-matrix, second output block from second sub-matrix and third output block from third sub-matrix. After using the codeword-to-layer mapping as specified in Table 2 and FIG. 7, codeword symbols of same CB are allocated to different resource locations of the different layers. In this example, $R_{mux}$ is divisible by 3 and each sub-channel interleaver is full. In general, the sub-channel interleavers do not have to be full where dummy symbols may be added to fill a sub-channel interleaver. Dummy symbols may be inserted to fill the rectangular interleavers when the symbols are written into the rectangle, and the dummy symbols may be discarded when the symbols are read out from the rectangle.

In FIGS. 15a and 19, codeword symbols of same CB are allocated to different resource location of the other layer but the whole codeword symbol of one CB is not overlapped with the whole codeword symbols of the other CB. In example of FIG. 19, the codeword symbol $C_0(0)$, $C_0(2)$ of first CB $C_0$ is overlapped with the codeword symbol $C_1(1)$, $C_1(3)$ of second CB $C_1$ while the codeword symbol $C_0(1)$, $C_0(3)$ of first CB $C_0$ is overlapped with the codeword symbol $C_2(0)$, $C_2(2)$ of second CB $C_2$. Since codeword symbol of one CB is not completely overlapped with codeword symbols of the other layer, it would be more complex to implement SIC receiver.

Figure 20:
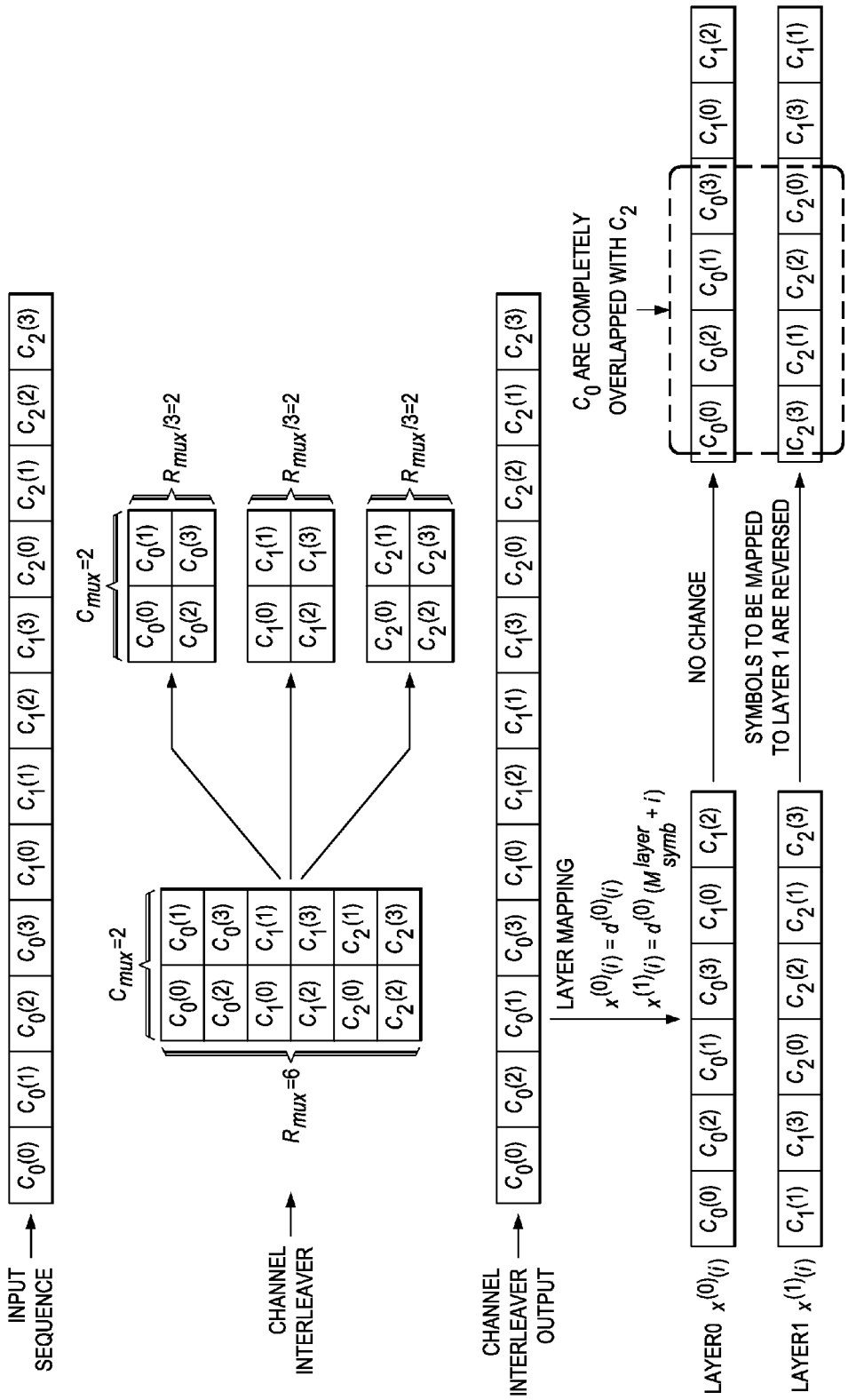
FIG. 20 is diagram of a detailed view of the codeword-to-layer mapping illustrated in FIG. 14 when it is cooperated with Reverse unit in FIG. 10.
Figure 21:
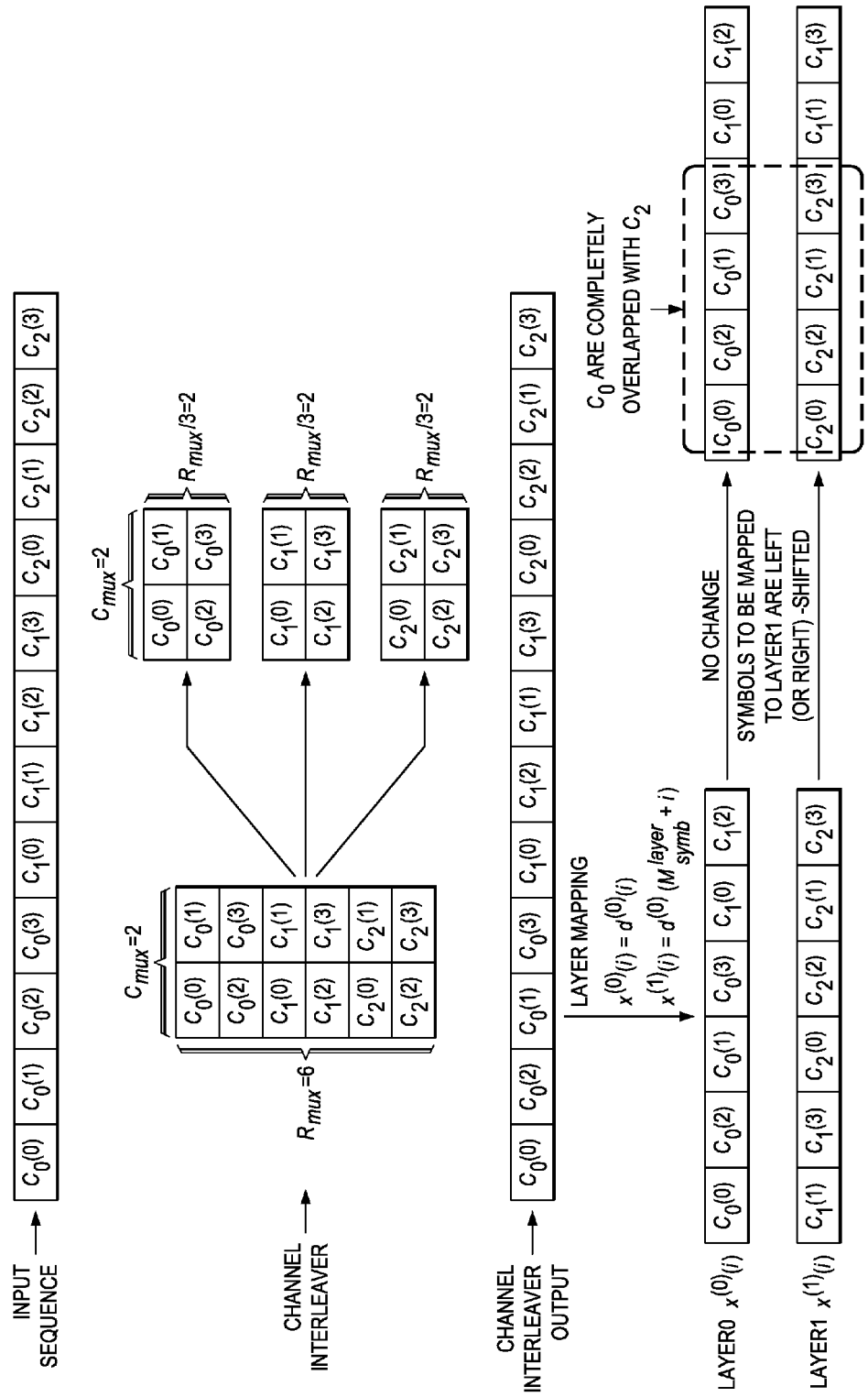
FIG. 21 is diagram of a detailed view of the codeword-to-layer mapping illustrated in FIG. 14 when it is cooperated with Reverse unit in FIG. 12.

To simplify the SIC receiver, the whole symbols of one CB may overlap with the whole symbols of the other layer if the embodiments of FIGS. 14 and 18 with the Reverse unit 1003 or Shift unit 1203 are applied to the embodiments of FIGS. 10 and 12. FIGS. 20 and 21 illustrate a detailed example of the codeword-to-layer mapping when the Reverse unit and Shift unit are combined with the channel interleaver and layer mapping method shown in FIGS. 15a and 19. In FIGS. 20 and 21, whole codeword symbols of first CB $C_0$ is overlapped with whole codeword symbols of third CB $C_2$ but codeword symbols of second CB $C_1$ are overlapped with its own codeword symbols. In the above discussed case, SIC receiver is facilitated with the code block $C_0$ and $C_2$ while only MMSE receiver can be employed for the code block $C_1$.

Figure 22:
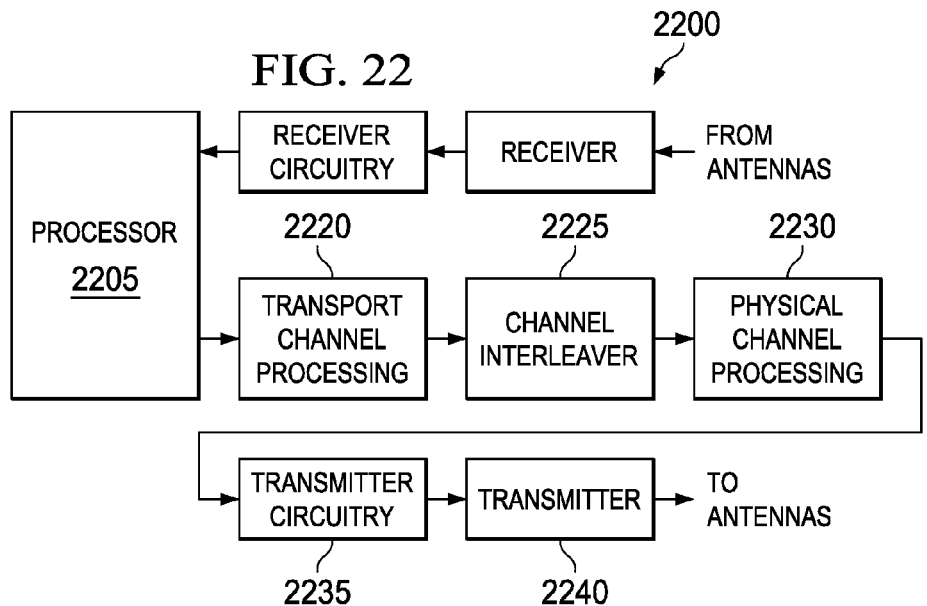
FIG. 22 is a diagram of a communications device.

FIG. 22 illustrates a communications device 2200. Communications device 2200 may be a base station (or a mobile station) communicating using spatial multiplexing on a DL (or on an UL for a mobile station). Communications device 2200 includes a processor 2205 that may be used to execute applications and programs. Communications device 2200 includes a receive chain and a transmit chain.

The transmit chain of communications device 2200 includes a transport channel processing unit 2220 that may provide transport channel processing such as applying CRC data to a transport block, segmenting, channel coding, rate matching, concatenating, and so on, to information to be transmitted.

Transmit chain of communications device 2200 also includes a channel interleaver 2225. Channel interleaver 2225 may be implemented as a multi-layer channel interleaver with a plurality of sub-channel interleavers, wherein there may be as many sub-channel interleavers as there are layers that a codeword may be mapped onto. Channel interleaver 2225 may follow any of a variety of interleaver, such as a block interleaver, bit reversal interleaver, and so forth, while the sub-channel interleavers may be modulation-symbol or bit level interleavers, for example.

Transmit chain of communications device 2200 further includes a physical channel processing unit 2230, transmitter circuitry 2235, and a transmitter 2240. Physical channel processing unit 2230 may provide the codeword-to-layer mapping function, such as those described previously. Physical channel processing unit 2230 may provide other physical channel processing such as scrambling, modulation/coding scheme selection and mapping, signal generating, and so forth. Transmitter circuitry 2235 may provide processing such as parallel to serial converting, amplifying, filtering, and so on. Transmitter 2240 may transmit the information to be transmitted using one or more transmit antennas.

Although shown in FIG. 22 as being located immediately ahead of physical channel processing unit 2230, channel interleaver 2225 may be placed in any of a variety of positions in the transmit chain of communications device 2200. Preferably the channel interleaver 2225 is placed before a layer mapping unit (part of physical channel processing unit 2230). Alternatively it may be placed after the layer mapping unit as illustrated in FIG. 16. In general, the position of channel interleaver 2225 may be relatively position independent as long as it achieves the desired interleaving effect together with the layer mapping unit of physical channel processing unit 2230.

Figure 23:
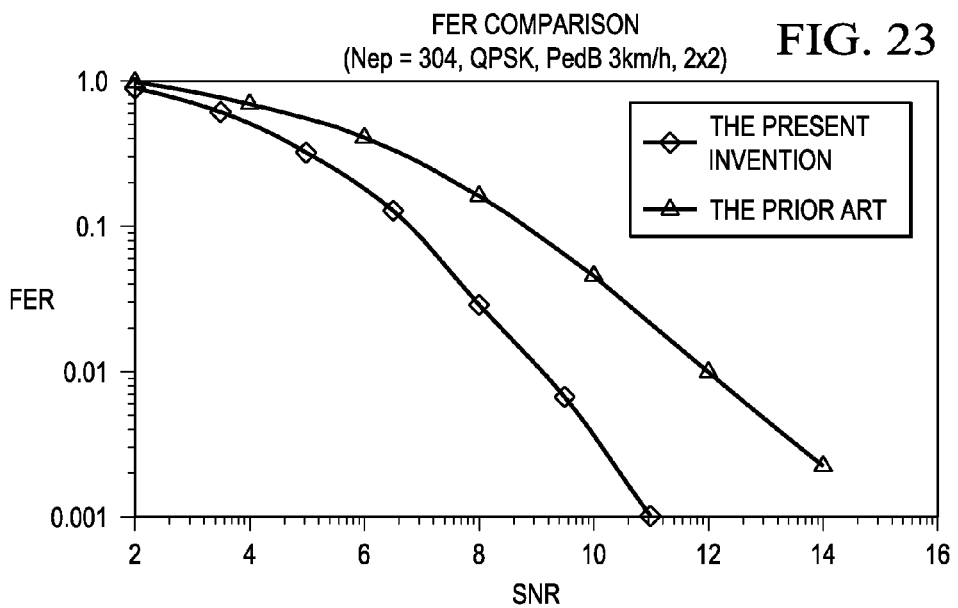
FIG. 23 is a data plot of signal to noise ratio versus frame error rate.

FIG. 23 illustrates a performance comparison of the embodiments with a prior art technique. Simulation parameters used for computing data shown in FIG. 23 are shown in Table 5. As shown in FIG. 23 the codeword-to-layer mapping of the embodiments provide about 2.8 dB improvement over the prior art technique.

TABLE 5

Simulation Parameters.

| Simulation Parameters | Value |
| --- | --- |
| Number of Code Block | 2 |
| Packet size of code block | 304 |
| Modulation | QPSK (quadrature phase shift keying) |
| Antenna Configuration | 2 for transmission and 2 for receiving antenna |
| Channel model | ITU Pedestrian B (there are 6 multi-path) |
| Mobile Speed | 3 km/h |

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting information over M layers, where M is a positive integer value representing a number of spatial layers, and M≥2, the method comprising:
   receiving at least two codewords to transmit, wherein the at least two codewords each comprises a plurality of symbols, each symbol composed of two or more code bits;
   grouping the plurality of symbols in the at least two codewords into M groups using an interleaver comprising M same-level sub-interleavers with one sub-interleaver per group;
   mapping the M groups to the M layers, wherein the plurality of symbols in each codeword are mapped to non-corresponding symbol positions across the M layers; and
   transmitting the M layers on an uplink from a user equipment to a base station using single carrier frequency division multiple access (SC-FDMA).

2. The method of claim 1, wherein the grouping comprises interleaving the plurality of symbols in the at least one codeword.

3. The method of claim 2, wherein the interleaving is performed via block interleaving.

4. The method of claim 1, wherein the grouping comprises interleaving each codeword separately.

5. The method of claim 4, wherein each codeword is interleaved using a block interleaver.

6. The method of claim 1, wherein grouping the plurality of symbols comprises:
   storing the plurality of symbols in a matrix of size $R_{mux} \times C_{mux}$, where $R_{mux}$ and $C_{mux}$ are integers, $R_{mux}$ is a multiple of M, size $R_{mux} \times C_{mux}$ is greater than or equal to a number of symbols in the plurality of symbols;
   splitting the matrix into M sub-matrices of size $R_{mux}/M \times C_{mux}$; and
   outputting symbols from each of the M sub-matrices, where an output of a J-th matrix of size $R_{mux}/M \times C_{mux}$ corresponds to a J-th group, where J is a positive integer value ranging from 1 to M.

7. The method of claim 6, wherein the storing of the plurality of symbols in the matrix of size $R_{mux} \times C_{mux}$ occurs in a row by row fashion.

8. The method of claim 6, wherein the outputting each of the M matrices of size $R_{mux}/M \times C_{mux}$ occurs in a column by column fashion.

9. The method of claim 1, wherein symbols of at least one of the M groups are reversed.

10. The method of claim 1, wherein symbols of at least one of the M groups are shifted.

11. The method of claim 1, wherein there are K codewords, each codeword comprises symbols of a transport block where the symbols contain code bits of the transport block after encoding, where K is a positive integer value, and wherein the grouping the plurality of symbols is performed by interleaving the K codewords separately.

12. The method claim 11, wherein the grouping is performed using the interleaver further comprising K multi-layer interleavers, with each multi-layer interleaver comprising a set of the M same-level sub-interleavers.

13. A method for transmitting information, the method comprising:
   processing a transport channel to generate a plurality of codewords, wherein each codeword comprises a sequence of modulation symbols;
   separately interleaving the plurality of codewords, wherein the interleaving is performed over the modulation symbols, thereby producing interleaved codewords;
   mapping the interleaved codewords to multiple spatial layers, wherein the modulation symbols in each codeword are mapped to non-corresponding symbol positions across the multiple spatial layers; and
   transmitting the multiple spatial layers on an uplink from a user equipment to a base station using single carrier frequency division multiple access (SC-FDMA).

14. The method of claim 13, where a modulation symbol is represented by a plurality of bits that correspond to the modulation symbol.

15. The method of claim 13, wherein separately interleaving the plurality of codewords comprises separately interleaving each codeword with a block interleaver.

16. The method of claim 15, wherein separately interleaving each codeword with a block interleaver comprises writing symbols of the codeword into a matrix of size $R_{mux} \times C_{mux}$ in a row by row fashion.

17. The method of claim 13, wherein separately interleaving the plurality of codewords comprises:
   writing symbols of the codewords into a matrix of size $R_{mux} \times C_{mux}$, where $C_{mux}$ and $R_{mux}$ are integers, $R_{mux}$ is a multiple of M, and M is an integer denoting a number of spatial layers;
   splitting the matrix into M sub-matrices, wherein each sub-matrix is of size $(R_{mux}/M) \times C_{mux}$; and
   producing a group of symbols from each of the M sub-matrices.

18. The method of claim 17, wherein the producing an i-th group of symbols comprises outputting symbols stored in an i-th sub-matrix in a column by column fashion, $1 \le i \le M$.

19. The method of claim 18, wherein the producing a group of symbols further comprises reversing or shifting the outputted symbols stored in the i-th sub-matrix.

20. A user equipment communications device comprising:
   a transmitter, of the user equipment communications device, configured to be coupled to at least one transmit antenna, the transmitter configured to transmit signals with the at least one transmit antenna to a base station on an uplink using single carrier frequency division multiple access (SC-FDMA);
   a transport channel processing unit coupled to a processor, the transport channel processing unit configured to provide transport channel processing to transport blocks provided by the processor;
   a channel interleaver coupled to the transport channel processing unit, the channel interleaver comprising two or more same-level sub-channel interleavers, the channel interleaver configured to interleave modulation symbols of at least two of the transport blocks provided by the transport channel processing unit; and
   a physical channel processing unit coupled to the channel interleaver and to the transmitter, the physical channel processing unit configured to provide physical channel processing to the interleaved modulation symbols provided by the channel interleaver, wherein the physical channel processing includes mapping the modulation symbols to multiple transmission layers, and wherein the modulation symbols in each of the at least two transport blocks are mapped to non-corresponding symbol positions across the multiple transmission layers.

21. The communications device of claim 20, where each modulation symbol is represented by a plurality of bits corresponding to the modulation symbol.

22. The communications device of claim 20, wherein the transport channel processing comprises appending error check data to a transport block, segmenting, channel coding, rate matching, concatenating, or a combination thereof.

23. The communications device of claim 20, wherein the physical channel processing further comprises scrambling, modulation/coding scheme selection, signal generating, or a combination thereof.

24. The communications device of claim 20, wherein the channel interleaver is a block interleaver.

25. The communications device of claim 24, wherein the channel interleaver comprises M sub-channel interleavers, where M is a number of the transmission layers, and $M \ge 2$.

26. The communications device of claim 24, wherein the channel interleaver comprises K sub-channel interleavers, where K is a number of the transport blocks, $K \ge 2$.

27. The communications device of claim 24, wherein there are K transport blocks, where K is a positive integer value, wherein the channel interleaver comprises K multi-layer channel interleavers with an i-th multi-layer channel interleaver comprising $M_i$ sub-channel interleavers, where $M_1 + M_2 + \ldots + M_K = M$ and M is a number of the transmission layers.

* * * * *